(12) United States Patent
Swenor et al.

(10) Patent No.: US 9,764,884 B2
(45) Date of Patent: Sep. 19, 2017

(54) PACKAGING MATERIALS INCLUDING A BARRIER FILM

(71) Applicant: Interface Biologics Inc., Toronto (CA)

(72) Inventors: Jamie Robert Swenor, Toronto (CA); Mark A. Steedman, Toronto (CA); Sanjoy Mullick, Brampton (CA)

(73) Assignee: Interface Biologics, Inc., Toronto (CA)

( * ) Notice: Subject to any disclaimer, the term of this patent is extended or adjusted under 35 U.S.C. 154(b) by 168 days.

(21) Appl. No.: 14/875,818

(22) Filed: Oct. 6, 2015

(65) Prior Publication Data

US 2016/0096936 A1    Apr. 7, 2016

Related U.S. Application Data

(60) Provisional application No. 62/060,320, filed on Oct. 6, 2014.

(51) Int. Cl.
*C08F 8/00* (2006.01)
*B29D 22/00* (2006.01)
(Continued)

(52) U.S. Cl.
CPC .............. *B65D 65/38* (2013.01); *B32B 27/08* (2013.01); *B32B 27/18* (2013.01); *B32B 27/302* (2013.01); *B32B 27/304* (2013.01); *B32B 27/306* (2013.01); *B32B 27/32* (2013.01); *B32B 27/325* (2013.01); *B32B 27/34* (2013.01); *B32B 27/36* (2013.01); *B32B 27/40* (2013.01); *B65B 55/04* (2013.01); *B65D 65/40* (2013.01);
(Continued)

(58) Field of Classification Search
CPC ......... B32B 27/08; B32B 27/32; B32B 27/40; B32B 27/18; B32B 27/304; B32B 27/306; B32B 27/325; B32B 27/34; B32B 27/36; B32B 2307/7246; B32B 2439/00; B32B 2439/70; B32B 2439/80; B32B 2250/24; B32B 2270/00; B65B 55/04; B65D 65/38; B65D 65/40; B65D 2565/387; C08J 7/047; C08J 2323/06; C08J 2475/04; Y02W 30/806
USPC .......... 53/425, 426, 452; 426/106; 428/220, 428/35.2, 35.7, 423.1; 525/130
See application file for complete search history.

(56) References Cited

U.S. PATENT DOCUMENTS 3,392,183 A   7/1968   Windemuth et al.
3,427,366 A   2/1969   Verdol et al.
(Continued)

FOREIGN PATENT DOCUMENTS

CA    2439225 A1    9/2002
CN    1894302 A     1/2007
(Continued)

OTHER PUBLICATIONS

U.S. Appl. No. 08/690,108, Santerre.
(Continued)

*Primary Examiner* — William Cheung
(74) *Attorney, Agent, or Firm* — Kristina Bieker-Brady; Clark & Elbing LLP

(57) ABSTRACT

The invention features a packaging material including a film having a barrier layer formed from an admixture containing a base polymer and a surface-modifying macromolecule. The invention also features containers made from the packaging materials and methods of storing a good.

37 Claims, 21 Drawing Sheets

Compound 1

(51) Int. Cl.

| | |
|---|---|
| *B29D 23/00* | (2006.01) |
| *B32B 27/32* | (2006.01) |
| *B32B 27/00* | (2006.01) |
| *A23B 7/148* | (2006.01) |
| *B65B 55/02* | (2006.01) |
| *B65B 55/04* | (2006.01) |
| *B65B 3/02* | (2006.01) |
| *B65D 65/38* | (2006.01) |
| *B32B 27/08* | (2006.01) |
| *B32B 27/40* | (2006.01) |
| *B32B 27/18* | (2006.01) |
| *B65D 65/40* | (2006.01) |
| *B32B 27/30* | (2006.01) |
| *B32B 27/34* | (2006.01) |
| *B32B 27/36* | (2006.01) |
| *C08J 7/04* | (2006.01) |

(52) U.S. Cl.
CPC ....... *B32B 2250/24* (2013.01); *B32B 2270/00* (2013.01); *B32B 2307/7246* (2013.01); *B32B 2323/046* (2013.01); *B32B 2439/00* (2013.01); *B32B 2439/70* (2013.01); *B32B 2439/80* (2013.01); *B65D 2565/387* (2013.01); *C08J 7/047* (2013.01); *C08J 2323/06* (2013.01); *C08J 2475/04* (2013.01); *Y02W 30/806* (2015.05)

(56) References Cited

U.S. PATENT DOCUMENTS

| | | |
|---|---|---|
| 3,872,058 A | 3/1975 | Gresham |
| 4,312,907 A | 1/1982 | Hiraoka et al. |
| 4,584,362 A | 4/1986 | Leckart et al. |
| 4,661,530 A | 4/1987 | Gogolewski et al. |
| 4,742,090 A | 5/1988 | Hunter et al. |
| 4,788,083 A | 11/1988 | Dammann et al. |
| 4,792,354 A | 12/1988 | Matsuo et al. |
| 4,861,830 A | 8/1989 | Ward, Jr. |
| 4,994,503 A | 2/1991 | Harris et al. |
| 5,064,871 A | 11/1991 | Sciangola |
| 5,145,727 A | 9/1992 | Potts et al. |
| 5,149,576 A | 9/1992 | Potts et al. |
| 5,242,995 A | 9/1993 | Kim et al. |
| 5,264,572 A | 11/1993 | Endo et al. |
| 5,395,525 A | 3/1995 | Takano et al. |
| 5,468,365 A | 11/1995 | Menchen et al. |
| 5,486,570 A | 1/1996 | St. Clair |
| 5,543,200 A | 8/1996 | Hargis et al. |
| 5,589,563 A | 12/1996 | Ward et al. |
| 5,779,897 A | 7/1998 | Kalthod et al. |
| 5,908,701 A | 6/1999 | Jennings et al. |
| 5,929,201 A | 7/1999 | Gibbons et al. |
| 6,111,049 A | 8/2000 | Sendijarevic et al. |
| 6,127,485 A | 10/2000 | Klun et al. |
| 6,127,507 A | 10/2000 | Santerre |
| 6,254,645 B1 | 7/2001 | Kellis, Jr. et al. |
| 6,353,057 B1 | 3/2002 | He et al. |
| 6,416,838 B1 | 7/2002 | Arney et al. |
| 6,448,364 B1 | 9/2002 | Clatty et al. |
| 7,323,435 B1 | 1/2008 | Turri et al. |
| 8,071,683 B2 | 12/2011 | Mullick et al. |
| 8,178,620 B2 | 5/2012 | Mullick et al. |
| 8,318,867 B2 | 11/2012 | Mullick et al. |
| 8,338,537 B2 | 12/2012 | Mullick et al. |
| 8,877,062 B2 | 11/2014 | Mullick et al. |
| 8,945,702 B2 | 2/2015 | Wuest et al. |
| 2004/0121175 A1 | 6/2004 | Flexman et al. |
| 2005/0079372 A1* | 4/2005 | Schmal .................. B32B 27/08 428/482 |
| 2005/0176893 A1 | 8/2005 | Rana et al. |
| 2007/0014927 A1 | 1/2007 | Buckanin et al. |
| 2007/0032624 A1 | 2/2007 | Roesler et al. |
| 2007/0037891 A1 | 2/2007 | Esfand et al. |
| 2007/0155935 A1 | 7/2007 | Rukavina et al. |
| 2008/0113199 A1 | 5/2008 | Peng et al. |
| 2008/0228253 A1 | 9/2008 | Mullick et al. |
| 2009/0211968 A1 | 8/2009 | Ho et al. |
| 2011/0009799 A1 | 1/2011 | Mullick et al. |
| 2011/0207893 A1 | 8/2011 | Mullick et al. |
| 2011/0271961 A1 | 11/2011 | Mullick et al. |
| 2013/0299079 A1 | 11/2013 | Manabe et al. |
| 2014/0206251 A1 | 7/2014 | Stokes |
| 2015/0008179 A1 | 1/2015 | Mullick et al. |
| 2015/0025198 A1 | 1/2015 | Mullick et al. |
| 2015/0344748 A1 | 12/2015 | Wohl et al. |

FOREIGN PATENT DOCUMENTS

| | | |
|---|---|---|
| EP | 0068509 A2 | 1/1983 |
| EP | 0073978 A2 | 3/1983 |
| EP | 0231927 A2 | 8/1987 |
| EP | 0293863 A2 | 12/1988 |
| EP | 0327906 A1 | 8/1989 |
| EP | 0332261 A1 | 9/1989 |
| EP | 0333083 A2 | 9/1989 |
| EP | 0335664 A2 | 10/1989 |
| EP | 0615778 A1 | 9/1994 |
| EP | 0894823 A1 | 2/1999 |
| EP | 1454929 B1 | 11/2009 |
| JP | 2002-504938 A | 2/2002 |
| JP | 5554996 B2 | 7/2014 |
| RU | 2215012 C2 | 10/2003 |
| WO | WO-95/26993 A1 | 10/1995 |
| WO | WO-97/06195 A1 | 2/1997 |
| WO | WO-98/34718 A1 | 8/1998 |
| WO | WO-98/51725 A1 | 11/1998 |
| WO | WO-2004/056459 A1 | 7/2004 |
| WO | WO-2005/058999 A1 | 6/2005 |
| WO | WO-2007/084514 A2 | 7/2007 |
| WO | WO-2008/076345 A1 | 6/2008 |
| WO | WO-2010/009191 A2 | 1/2010 |
| WO | WO-2010/025398 A1 | 3/2010 |
| WO | WO-2011/072398 A1 | 6/2011 |
| WO | WO-2013/180531 A1 | 12/2013 |

OTHER PUBLICATIONS

U.S. Appl. No. 12/780,200, Mullick et al.
Text abstracts available from: Strokowski, "Adsorption and Hemocompatibility Properties of Elastin-like Polypeptide Surfaces", Cai, "Carboxyl-Ebselen-Based Layer-by-Layer Film: A Potential Antithrombotic and Antimicrobial Coating", Cook, "Surface Modifications with Improved Long-Term Hemocompatibility", Dirks, "Non-Adhesive and Antimicrobial Coatings for Medical Implants," Surfaces in Biomaterials Foundation, BioInterface Conference, Oct. 24-26, Bloomington, MN (2011) (15 pages).
Communication enclosing the First Office Action for Chinese Application No. 200980142812.7, mailed Jul. 4, 2012 (14 pages).
Engelberg et al., "Physico-mechanical properties of degradable polymers used in medical applications: a comparative study." Biomaterials. 12(3):292-304 (1991).
Examination Report for European Patent No. 07862900.3, dated Jun. 20, 2011 (4 pages).
Examination Report issued for European Patent Application No. 96 925 626.2-2115, dated Apr. 30, 1999 (4 pages).
Examination Report issued for European Patent Application No. 96 925 626.2-2115, dated Dec. 15, 1998 (5 pages).
Examination Report issued for European Patent Application No. 96 925 626.2-2115, dated Feb. 17, 2000 (5 pages).
Extended European Search Report for European Application No. 09810679, dated Sep. 26, 2013 (10 pages).
Extended European Search Report from European Patent Application No. 07862900.3, dated Jul. 27, 2010 (9 pages).
Extended European Search Report issued for European Patent Application No. 10014044, dated Jan. 26, 2011 (11 pages).
Goldberg, "Elastomeric polycarbonate block copolymers," Journal of Polymer Science: Part C. 4: 707-730 (1963).

(56) References Cited

OTHER PUBLICATIONS

International Preliminary Report on Patentability for International Application No. PCT/CA2015/051008, dated Apr. 11, 2017 (6 pages).
International Preliminary Report on Patentability for International Application No. PCT/US2007/025577, dated Jun. 16, 2009.
International Preliminary Report on Patentability for International Application No. PCT/US2009/055418, dated Mar. 1, 2011 (8 pages).
International Search Report and Written Opinion for International Application No. PCT/CA2015/051333, dated Mar. 22, 2016 (10 pages).
International Search Report and Written Opinion for International Application No. PCT/US2009/055418, dated Oct. 20, 2009 (10 pages).
International Search Report and Written Opinion for International Patent Application No. PCT/CA2015/051008, dated Dec. 22, 2015 (9 pages).
International Search Report and Written Opinion issued for International Application No. PCT/US2007/025577, dated Apr. 17, 2008.
Jin et al., "Thermotropic liquid crystalline polyesters with rigid or flexible spacer groups," The British Polymer Journal. 132-146 (1980).
Kakimoto et al., "Preparation and properties of fluorine-containing polyarylates from tetrafluoroisophthaloyl chloride and bisphenols." J Poly Sci pt A: Ply Chem. 25:2747-53 (1987).
Kulesza et al., "Thermal decomposition of bisphenol a-based polyetherurethanes blown with pentane part I-thermal and pyrolytical studies." J Anal Appl Pyrolysis. 76:243-248 (2006).
La Mantia et al., "Thermo-mechanical degradation of polymer blends." Die Angewandte Makromolekulare Chemie. 216:45-65 (1994).
Liaw et al., "Curing kinetics of epoxy resins based on bisphenol-S and its derivatives." Die Angewandte Makromolekular Chemie. 200:137-46 (1992).
Liaw et al., "Curing of acrylated epoxy resin based on bisphenol-s," Polymer Engineering and Science. 34(16):1297-1303 (1994).
Liaw et al., "Radical polymerization of mono- and di-methacrylic esters containing bisphenol-s," Die Angewandte Makromolekulare Chemie. 207:43-52 (1993).
Liaw et al., "Synthesis of epoxy resins based on bisphenol-s and its derivatives," Die Angewandte Makromolekulare Chemie. 199:171-190 (1992).
Liaw, "The relative physical and thermal properties of polyurethane elastomers: effect of chain extenders of bisphenols, diisocyanate, and polyol structures," Journal of Applied Polymer Science. 66:1251-1265 (1997).
Marks, "Interfacial synthesis and characterization of random and segmented block bisphenol A-tetrabromobisphenol A copolycarbonates." J Appl Poly Sci. 52:467-81 (1994).
Maruyama et al., "Synthesis and properties of fluorine-containing aromatic polybenzoxazoles from bis(o-aminophenols) and aromatic diacid chlorides by the silylation method," Macromolecules. 21(8):2305-2309 (1988).
Maruyama et al., "Synthesis and properties of polyarylates from 2,2-Bis(4-hydroxyphenyl)-1,1,1,3,3,3-hexafluoropropane and aromatic diacid chlorides," Journal of Polymer Science: Part A: Polymer Chemistry. 24:3555-3558 (1986).
Mitsui Chemicals America, Inc. "NOTIOTM Nano-crystal structure controlled elastomer," www.mitsuichemicals.com/notio.htm#, retrieved Dec. 11, 2011 (2 pages).
Nagata et al., "Synthesis and properties of polyamides derived from systematically halogenated terephthalic acids with fluorine, chlorine, or bromine atoms," Journal of Polymer Science: Part A: Polymer Chemistry 26:235-245 (1988).
Notice of Allowance for U.S. Appl. No. 12/002,226, dated Oct. 18, 2011 (27 pages).
Notice of Allowance for U.S. Appl. No. 13/185,985, dated Mar. 2, 2012 (25 pages).
Notice of Allowance for U.S. Appl. No. 13/465,406, dated Oct. 3, 2012 (25 pages).
Notice of Reasons for Rejection for Japanese Application No. 2011-525245, dated Sep. 24, 2013 (8 pages).
Office Action for Canadian Application No. 2,735,442, dated Jul. 16, 2015 (5 pages).
Office Action for Canadian Application No. 2,735,442, dated Mar. 29, 2016 (6 pages).
Office Action for European Patent Application No. 09810679.2, dated Dec. 12, 2014 (5 pages).
Office Action for U.S. Appl. No. 13/060,542 dated Jul. 5, 2012 (89 pages).
Office Action pertaining to U.S. Appl. No. 08/690,108, dated Apr. 24, 1998 (6 pages).
Office Action pertaining to U.S. Appl. No. 08/690,108, dated Oct. 31, 1997 (8 pages).
Office Action pertaining to U.S. Appl. No. 09/198,268, dated Jan. 21, 2000 (6 pages).
Office Action pertaining to U.S. Appl. No. 09/198,268, dated May 12, 1999 (6 pages).
Office Action pertaining to U.S. Appl. No. 12/002,226, dated Jan. 26, 2010 (8 pages).
Office Action pertaining to U.S. Appl. No. 12/002,226, dated Oct. 5, 2010 (13 pages).
Shimizu et al., "Synthesis and characterization of fluorine-containing aromatic polyethers from tetrafluoroisophthalonitrile and bisphenols," Journal of Polymer Science: Part A: Polymer Chemistry. 25:2385-2393 (1987).
Suk et al., "Study on the kinetics of surface migration of surface modifying macromolecules in membrane preparation." Macromol. 35:3017-21 (2002).
Sukumar et al., "Synthesis and thermal studies of block copolymers from NR and MDI-based polyurethanes." J Appl Poly Sci. 111:19-28 (2009).
Tang et al., "Synthesis of surface-modifying macromolecules for use in segmented polyurethanes," Journ App Poly Sci. 62: 1133-45 (1996).
Tang et al., "Use of surface-modifying macromolecules to enhance the biostability of segmented polyurethanes," J Biomed Mater Res. 35(3):371-81 (1997).
Urquhart et al., "TOF-SIMS analysis of a 576 micropatterned copolymer array to reveal surface moieties that control wettability," Anal Chem. 80(1):135-42 (2008).
Wohl et al., "Synthesis and surface characterization of copoly(imide alkyl ether)s containing pendant fluoroalkyl groups," J Appl Polym Sci. 132(9):41538 (2015) (11 pages).
Woods, *The ICI Polyurethanes Book 1st Ed.*, Chichester, Wiley and Sons, p. 323 (1987).

* cited by examiner

Compound 1

Compound 2
PCN = poly((2,2-dimethyl)-1,3-propylene carbonate

Compound 3
PPO = poly(propylene oxide)

Compound 4
HLBH = hydrogenated polybutadiene

Compound 5
PEB = poly(ethylene-co-butylene)

Compound 6

Compound 7

Compound 8
LBHP = polybutadiene

Compound 9
PEGA = poly(diethylene glycol)adipate

Compound 10
PDP = (diethylene glycol-ortho phthalic anhydride) polyester

Compound 11
PTMO = polytetramethylene oxide

Compound 12

Compound 13

Compound 14

Compound 15

Compound 16

Compound 17

Compound 19

Compound 20

Compound 21

Compound 23

Compound 24

Compound 25

Compound 27 (m = 25)

Compound 28

PACKAGING MATERIALS INCLUDING A BARRIER FILM

CROSS-REFERENCE TO RELATED APPLICATIONS

This application claims the benefit of U.S. Provisional Application No. 62/060,320, filed Oct. 6, 2014, the disclosure of which is incorporated herein by reference in its entirety.

FIELD OF THE INVENTION

This invention relates to the packaging materials and containers formed therefrom. The packaging materials include a film having a barrier layer formed from an admixture of a base polymer and a surface-modifying macromolecule.

BACKGROUND

Permeation of various liquids and gases through plastic films, pipes, or containers can be a problem in some circumstances (e.g., permeation of water vapor through food or pharmaceutical packages) for particular uses. For example, the pharmaceutical industry has developed complex dosage forms that may be susceptible to degradation upon prolonged exposure to moisture. Currently, a number of approaches are available to address the problem of packaging material permeability. Many of these approaches, however, require high cost materials and/or increased manufacturing complexity, and/or the use of toxic or corrosive reagents to achieve the goal of permeability reduction.

In one approach, reduction of the permeability of a packaging material is achieved through a chemical surface treatment (e.g., oxidation with fluorine or sulfur trioxide). For example, polyalkylene containers are sometimes treated with gaseous fluorine to inhibit permeation of gasoline, pesticide, or herbicide products from the containers. U.S. Pat. No. 3,862,284 discloses a process of modifying surface properties of blow-molded thermoplastic articles using a blowing gas which contains fluorine. British Patent No. 2,069,870 discloses a process for reducing permeability of a surface of a container by treating the surface of the container with sulfur trioxide, washing with an aqueous medium, and applying a layer of a dispersion of a melamine-formaldehyde or urea-formaldehyde condensation product. While the chemical surface treatment can provide the treated material with requisite barrier properties, this approach can also be costly to implement, particularly, on large scale, because of the need for aggressive, toxic chemicals (e.g., fluorine or sulfur trioxide), which require special handling and specialized non-corroding equipment.

In another approach, reduction of the permeability of a packaging material is achieved through the use of multilayer films in which each layer has a dedicated function. For example, U.S. Pat. No. 4,515,836 discloses a process for coating a substrate, such as poly(ethylene terephthalate), with a gas barrier coating of a copolymer of vinylidene chloride and small amounts of another co-monomer, such as acrylates or acrylonitrile. Current many pharmaceutical blister packages are often prepared from such multilayer films (e.g., PVC/PE/PVdC, PVC/PCTFE/PVC, PVC/EVOH/PCTFE, and PVC/PE/PCTFE). However, the need for each additional layer in a film leads to an increase (1) in packaging weight, (2) manufacturing complexity, (3) and material expenditure, thereby driving the end consumer costs higher.

There remains a need for inexpensive and easy to manufacture on large scale packaging materials having a barrier film, particularly, for food and pharmaceutical packaging. Thus, the present invention addresses the problem of reducing packaging material permeability without the disadvantages of the approaches outlined above.

SUMMARY OF THE INVENTION

In general, the invention relates to packaging materials, containers made therefrom, and methods of storing goods. The packaging materials of the invention include a layer with enhanced barrier properties, thereby negating the need for the use of dedicated barrier layers in packaging materials.

In a first aspect, the packaging materials of the invention contain a film including a barrier layer formed from an admixture containing a base polymer and a surface-modifying macromolecule. In particular, the packaging materials of the invention include a film having at least one multifunctional barrier layer, in which the base polymer provides one function (e.g., maintenance of a shape of the packaging material of the invention) and the surface-modifying macromolecule provides an additional function (e.g., enhancement of barrier properties of the base polymer). The barrier layer of the invention may have a water vapor transmission rate (WVTR) less than or equal to 5.0 g/(m$^2$·day·mil) (e.g., less than or equal to 4.0 g/(m$^2$·day·mil), or less than or equal to 3.5 g/(m$^2$·day·mil)) at 38° C. and 90% RH (ASTM F1249). In certain embodiments, the barrier layer has a WVTR greater than or equal to 0.01 g/(m$^2$·day·mil) (e.g., greater than or equal to 0.1 g/(m$^2$·day·mil), or greater than or equal to 0.5 g/(m$^2$·day·mil)) at 38° C. and 90% RH (ASTM F1249). In particular embodiments, the barrier layer has a WVTR from 0.05 to 5.0 g/(m$^2$·day·mil) (e.g., from 0.05 to 4.0 g/(m$^2$·day·mil), or from 0.05 to 3.5 g/(m$^2$·day·mil)) at 38° C. and 90% RH (ASTM F1249). In some embodiments (e.g., embodiments related to pharmaceutical packaging materials), the barrier layer has a WVTR from 0.05 to 1.5 g/(m$^2$·day·mil) (e.g., from 0.05 to 1.0 g/(m$^2$·day·mil), or from 0.05 to 0.7 g/(m$^2$·day·mil)) at 38° C. and 90% RH (ASTM F1249). In other embodiments (e.g., embodiments related to food packaging materials), the barrier layer has a WVTR from 0.05 to 5.0 g/(m$^2$·day·mil) (e.g., from 0.5 to 4.0 g/(m$^2$·day·mil), or from 0.5 to 3.5 g/(m$^2$·day·mil)) at 38° C. and 90% RH (ASTM F1249). A WVTR of the barrier layer may be at least 10% lower (e.g., 20% lower, 30% lower, 40% lower, or 50% lower) than WVTR of the same layer without the surface-modifying macromolecule.

The base polymer may be a polyalkylene (e.g., a polyethylene, a polypropylene, polyvinyl chloride, polystyrene, ethylene vinyl alcohol, cyclic olefin polymer, or a cyclic olefin copolymer), a polyester (polyethylene terephthalate, polyethylene naphthalate, or polyhydroxybutanoate), a polyamide, a polyurethane, or a polysaccharide, or a blend of thereof. In some embodiments, the base polymer is a polyalkylene or a polyester or a blend thereof. In particular embodiments, the polyalkylene is a polyethylene, a polypropylene, polyvinyl chloride, polystyrene, or ethylene vinyl alcohol. In certain embodiments, the polyalkylene is a polyethylene, a polypropylene, or polyvinyl chloride.

The film may be formed from the admixture containing from 0.05% (w/w) to 10% (w/w) of the surface modifying macromolecule. The film may be formed by extrusion, calender rolling, casting, lamination, or solution deposition. In some embodiments, the film is formed by extrusion, calender rolling, or lamination.

The packaging material of the invention may be a forming web or a non-forming web. Certain packaging materials of the invention contain one and only one said barrier layer. Any packaging material of the invention may contain the barrier layer having a thickness equal to or less than 500 μm (e.g., equal to or less than 300 μm, or equal to or less than 200 μm). Any packaging material of the invention may contain the barrier layer having a thickness equal to or greater than 10 μm (e.g., equal to or greater than 25 μm). In some embodiments (e.g., embodiments related to pharmaceutical packaging materials), the barrier layer can have a thickness from 50 μm to 500 μm (e.g., from 100 μm to 400 μm, or from 150 μm to 350 μm). In other embodiments (e.g., embodiments related to food packaging materials), the barrier layer can have a thickness from 10 μm to 500 μm (e.g., from 12 μm to 300 μm, or from 25 μm to 200 μm). The barrier film may be a bilayer, a trilayer film, or a tetralayer film. The packaging material may contain two or more barrier layers, each of the barrier layers being formed from an admixture containing a base polymer and a surface-modifying macromolecule, each of the base polymers and surface-modifying macromolecules being same or different. In some embodiments, the base polymers in the barrier layers are the same. In other embodiments, the base polymers in the barrier layers are different. In particular embodiments, the surface-modifying macromolecules in the barrier layers are same. In yet other embodiments, the surface-modifying macromolecules in the barrier layers are different. The packaging material of the invention may be a sterilizable packaging material.

In a second aspect, the invention provides a container containing the packaging material of the first aspect. The container may be a primary package or a secondary package. The container may be a pouch, a box, or an envelope. The container may further include a good (e.g., a dry good or a liquid good). The good may be a food product or a pharmaceutical product.

In a third aspect, the invention provides a method of storing a good, involving preparing the packaging material of the first aspect and arranging the good and a container including the packaging material so as to isolate the good from the environment external to the container. The method may also involve forming the packaging material into the container prior to the arranging. The method may also involve sealing the container after the arranging. The method may include further processing (e.g., a sterilization step prior to the arranging step). Alternatively or additionally, the method may include further processing (e.g., a sterilization step after the arranging step).

In some embodiments of any aspect, the surface-modifying macromolecule is described by the structure of formula (I):

$$F_T\text{—}[B\text{-}A]_n\text{—}B\text{—}F_T \quad (I)$$

where

A includes hydrogenated polybutadiene, poly((2,2-dimethyl)-1,3-propylene carbonate), polybutadiene, poly(diethylene glycol)adipate, poly(hexamethylene carbonate), poly(ethylene-co-butylene), (neopentyl glycol-ortho phthalic anhydride) polyester, (diethylene glycol-ortho phthalic anhydride) polyester, (1,6-hexanediol-ortho phthalic anhydride) polyester, or bisphenol A ethoxylate;

B is a segment including a urethane; and $F_T$ is a polyfluoroorgano group, and n is an integer from 1 to 10.

In particular embodiments of formula (I), B is formed from a diisocyanate and a diol including A, wherein said diisocyanate is 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; or hexamethylene diisocyanate. In certain embodiments of formula (I), the diisocyanate is 4,4'-methylene bis(cyclohexyl isocyanate); m-tetramethylxylene diisocyanate; or 3-isocyanatomethyl-3,5,5-trimethyl-cyclohexylisocyanate. In other embodiments of formula (I), A is hydrogenated polybutadiene, polybutadiene, poly(ethylene-co-butylene), poly((2,2-dimethyl)-1,3-propylene carbonate), poly(diethylene glycol)adipate, or (diethylene glycol-ortho phthalic anhydride) polyester. In yet other embodiments of formula (I), A is hydrogenated polybutadiene, and said diisocyanate is 4,4'-methylene bis(cyclohexyl isocyanate). In still other embodiments of formula (I), A is poly(ethylene-co-butylene), and the diisocyanate is 4,4'-methylene bis(cyclohexyl isocyanate). In some embodiments of formula (I), A is poly((2,2-dimethyl)-1,3-propylene carbonate), and the diisocyanate is 4,4'-methylene bis(cyclohexyl isocyanate). In particular embodiments of formula (I), A is poly((2,2-dimethyl)-1,3-propylene carbonate), and the diisocyanate is 3-isocyanatomethyl-3,5,5-trimethyl-cyclohexylisocyanate. In certain embodiments of formula (I), A is polybutadiene, and the diisocyanate is 3-isocyanatomethyl-3,5,5-trimethyl-cyclohexylisocyanate. In other embodiments of formula (I), A is poly(diethylene glycol)adipate, and the diisocyanate is 4,4'-methylene bis(cyclohexyl isocyanate). In yet other embodiments of formula (I), A is (diethylene glycol-ortho phthalic anhydride) polyester, and said diisocyanate is m-tetramethylxylene diisocyanate.

In certain embodiments of any aspect, the surface modifying macromolecule is described by the structure of formula (II):

$$F_T\text{—}[B\text{-}A]_n\text{—}B\text{—}F_T \quad (II)$$

wherein

B includes a urethane;

A includes polypropylene oxide, polyethylene oxide, or polytetramethylene oxide;

$F_T$ is a polyfluoroorgano group; and n is an integer from 1 to 10.

In particular embodiments of formula (II), B is a segment formed from a diisocyanate and a diol including A, wherein said diisocyanate is 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; or hexamethylene diisocyanate. In some embodiments of formula (II), the diisocyanate is hexamethylene diisocyanate. In further embodiments of formula (II), A contains polypropylene oxide. In other embodiments of formula (II), A includes polytetramethylene oxide.

In certain embodiments of any aspect, the surface modifying macromolecule is described by the structure of formula (III) or (IV):

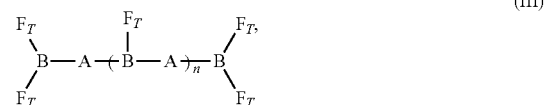

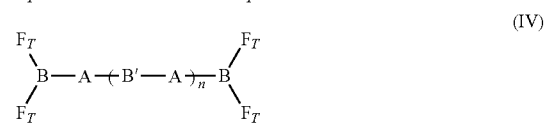

where

A is an oligomeric segment including an ether linkage, an ester linkage, a carbonate linkage, or a polyalkylene and having a theoretical molecular weight of from 500 to 5,000 Daltons (e.g., from 500 to 3,500 Daltons, from 500 to 2,000 Daltons, from 1,000 to 2,000 Daltons, or from 1,000 to 3,000 Daltons);

B is a segment including an isocyanurate trimer or biuret trimer; B', when present, is a hard segment including a urethane;

each $F_T$ is a polyfluoroorgano group; and n is an integer between 0 to 10.

In some embodiments of formula (III) or (IV), A includes hydrogenated polybutadiene (HLBH), poly((2,2-dimethyl)-1,3-propylene carbonate) (PCN), polybutadiene (LBHP), polytetramethylene oxide (PTMO), polypropylene oxide (PPO), (diethyleneglycol-orthophthalic anhydride) polyester (PDP), hydrogenated polyisoprene (HHTPI), poly(hexamethylene carbonate), or poly((2-butyl-2-ethyl)-1,3-propylene carbonate), or A is formed from hydroxylterminated polydimethylsiloxane (C22) or 1,12-dodecanediol. In certain embodiments of formula (III) or (IV), B is formed from a triisocyanate and a diol including A, where the triisocyanate is hexamethylene diisocyanate (HDI) biuret trimer, isophorone diisocyanate (IPDI) trimer, or hexamethylene diisocyanate (HDI) trimer. In further embodiments of formula (III) or (IV), A includes polytetramethylene oxide, and where the triisocyanate is hexamethylene diisocyanate (HDI) biuret trimer. In other embodiments of formula (III) or (IV), A includes polytetramethylene oxide, and where the triisocyanate is hexamethylene diisocyanate (HDI) trimer. In yet other embodiments of formula (III) or (IV), A includes hydrogenated polybutadiene, and where the triisocyanate is isophorone diisocyanate (IPDI) trimer. In still other embodiments of formula (III) or (IV), A includes hydrogenated polybutadiene, and where the triisocyanate is hexamethylene diisocyanate (HDI) biuret trimer. In some embodiments of formula (III) or (IV), A includes hydrogenated polybutadiene, and where the triisocyanate is hexamethylene diisocyanate (HDI) trimer. In certain embodiments of formula (III) or (IV), A includes poly((2,2-dimethyl)-1,3-propylene carbonate), and where the triisocyanate is isophorone diisocyanate (IPDI) trimer. In particular embodiments of formula (III) or (IV), A includes (diethyleneglycol-orthophthalic anhydride) polyester, and where the triisocyanate is isophorone diisocyanate (IPDI) trimer. In further embodiments of formula (III) or (IV), A includes hydrogenated polyisoprene (HHTPI), and where the triisocyanate is isophorone diisocyanate (IPDI) trimer. In other embodiments of formula (III) or (IV), A is formed from hydroxylterminated polydimethylsiloxane (C22), and where the triisocyanate is isophorone diisocyanate (IPDI) trimer. In yet other embodiments of formula (III) or (IV), A is formed from hydroxylterminated polydimethylsiloxane (C22), and where the triisocyanate is hexamethylene diisocyanate (HDI) biuret trimer. In still other embodiments of formula (III) or (IV), A includes poly(hexamethylene carbonate), and where the triisocyanate is isophorone diisocyanate (IPDI) trimer. In certain other embodiments of formula (III) or (IV), A includes polytetramethylene oxide, and where the triisocyanate is isophorone diisocyanate (IPDI) trimer. In some embodiments of formula (III) or (IV), A is formed from 1,12-dodecanediol, and where the triisocyanate is isophorone diisocyanate (IPDI) trimer.

In some embodiments of any aspect, the surface modifying macromolecule is described by the structure of formula (V):

(V)

where

Oligo is an oligomeric segment including polypropylene oxide, polyethylene oxide, or polytetramethyleneoxide and having a theoretical molecular weight of from 500 to 5,000 Daltons (e.g., 1,000 to 5,000 Daltons, from 2,000 to 5,000 Daltons, from 2,500 to 5,000 Daltons, from 500 to 3,000 Daltons, from 1,000 to 3,000 Daltons, from 500 to 2,000 Daltons, or from 1,000 to 2,000 Daltons);

B is a segment formed from a diisocyanate;

$F_T$ is a polyfluoroorgano group; and n is an integer from 1 to 10.

In certain embodiments of formula (V), B is a segment formed from a diisocyanate and a diol including Oligo, where the diisocyanate is 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; or hexamethylene diisocyanate. In particular embodiments of formula (V), the diisocyanate is hexamethylene diisocyanate. In further embodiments of formula (V), A includes polypropylene oxide or polytetramethylene oxide.

In particular embodiments of any aspect, the surface modifying macromolecule is described by the structure of formula (VI):

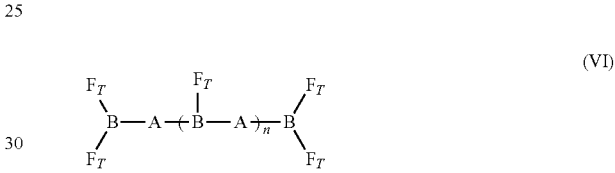

(VI)

where

A is an oligomeric segment including polyethylene oxide, polypropylene oxide, polytetramethylene oxide, or a mixture thereof, and having a theoretical molecular weight of from 500 to 5,000 Daltons (e.g., 1,000 to 5,000 Daltons, from 2,000 to 5,000 Daltons, from 2,500 to 5,000 Daltons, from 500 to 3,000 Daltons, from 1,000 to 3,000 Daltons, from 500 to 2,000 Daltons, or from 1,000 to 2,000 Daltons);

B is a hard segment including an isocyanurate trimer or biuret trimer;

$F_T$ is a polyfluoroorgano group; and n is an integer from 0 to 10.

In some embodiments of formula (VI), B is a segment formed from a triisocyanate with a diol of A. In further embodiments of formula (VI), the triisocyanate is hexamethylene diisocyanate (HDI) biuret trimer, isophorone diisocyanate (IPDI) trimer, or hexamethylene diisocyanate (HDI) trimer. In certain embodiments of formula (VI), A includes a block copolymer of polyethylene oxide and polypropylene oxide. In other embodiments of formula (VI), the block copolymer is (polyethylene oxide)-b-(polypropylene oxide)-b-(polyethylene oxide).

In certain embodiments of any aspect, the surface modifying macromolecule is described by the structure of formula (VII):

(VII)

where

Oligo is an oligomeric segment formed from a polycarbonate polyol having a theoretical molecular weight of from 500 to 5,000 Daltons (e.g., 1,000 to 5,000 Daltons, from 2,000 to 5,000 Daltons, from 2,500 to 5,000 Daltons, from 500 to 3,000 Daltons, from 1,000 to 3,000 Daltons, from 500 to 2,000 Daltons, or from 1,000 to 2,000 Daltons);

B is a segment formed from a diisocyanate;

$F_T$ is a polyfluoroorgano group; and n is an integer from 1 to 10.

In particular embodiments of formula (VII), B is a segment formed from a diisocyanate and a diol including Oligo, where the diisocyanate is 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; or hexamethylene diisocyanate. In other embodiments of formula (VII), the diisocyanate is 4,4'-methylene bis(cyclohexyl isocyanate) or 3-isocyanatomethyl-3,5,5-trimethyl-cyclohexylisocyanate. In yet other embodiments of formula (VII), Oligo includes poly((2,2-dimethyl)-1,3-propylene carbonate) (PCN).

In further embodiments of any aspect, the surface modifying macromolecule is described by the structure of formula (VIM):

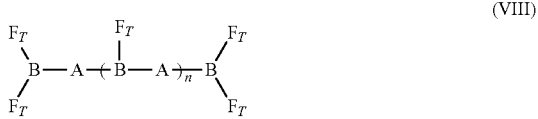

(VIII)

where

A is an oligomeric segment formed from a polycarbonate polyol having a theoretical molecular weight of from 500 to 5,000 Daltons (e.g., 1,000 to 5,000 Daltons, from 2,000 to 5,000 Daltons, from 2,500 to 5,000 Daltons, from 500 to 3,000 Daltons, from 1,000 to 3,000 Daltons, from 500 to 2,000 Daltons, or from 1,000 to 2,000 Daltons);

B is a segment including an isocyanurate trimer or biuret trimer;

$F_T$ is a polyfluoroorgano group; and n is an integer from 0 to 10.

In certain embodiments of formula (VIII), B is formed from a triisocyanate and a diol of A. In particular embodiments of formula (VIII), the triisocyanate is hexamethylene diisocyanate (HDI) biuret trimer, isophorone diisocyanate (IPDI) trimer, or hexamethylene diisocyanate (HDI) trimer. In other embodiments of formula (VIII), A includes poly ((2,2-dimethyl)-1,3-propylene carbonate) (PCN) or poly (hexamethylene carbonate) (PHCN).

In some embodiments of any aspect, the surface modifying macromolecule is described by the structure of formula (IX):

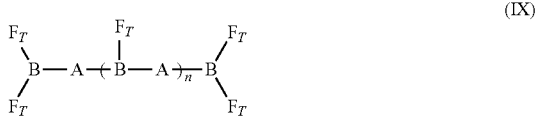

(IX)

where

A includes a first block segment selected from polypropylene oxide, polyethylene oxide, polytetramethyleneoxide, or a mixture thereof, and a second block segment including a polysiloxane or polydimethylsiloxane, where A has a theoretical molecular weight of from 500 to 5,000 Daltons (e.g., 1,000 to 5,000 Daltons, from 2,000 to 5,000 Daltons, from 2,500 to 5,000 Daltons, from 500 to 3,000 Daltons, from 1,000 to 3,000 Daltons, from 500 to 2,000 Daltons, or from 1,000 to 2,000 Daltons);

B is a segment including an isocyanurate trimer or biuret trimer;

$F_T$ is a polyfluoroorgano group; and n is an integer from 0 to 10.

In particular embodiments of formula (IX), B is formed from a triisocyanate and a diol of A. In other embodiments of formula (IX), the triisocyanate is hexamethylene diisocyanate (HDI) biuret trimer, isophorone diisocyanate (IPDI) trimer, or hexamethylene diisocyanate (HDI) trimer. In yet other embodiments of formula (IX), the triisocyanate is hexamethylene diisocyanate (HDI) biuret trimer or isophorone diisocyanate (IPDI) trimer. In still other embodiments of formula (IX), A includes a first block segment that is polypropylene oxide and a second block segment that is polydimethylsiloxane.

In further embodiments of any aspect, the surface modifying macromolecule is described by the structure of formula (X):

(X)

where

A is an oligomeric segment selected from the group consisting of hydrogenated polybutadiene (HLBH), polybutadiene (LBHP), hydrogenated polyisoprene (HHTPI), and polystyrene and has a theoretical molecular weight of from 750 to 3,500 Daltons (e.g., from 750 to 2,000 Daltons, from 1,000 to 2,500 Daltons, or from 1,000 to 3,500 Daltons);

B is a segment formed from a diisocyanate;

$F_T$ is a polyfluoroorgano group; and n is an integer from 1 to 10.

In some embodiments of formula (X), the diisocyanate is 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; or hexamethylene diisocyanate. In other embodiments of formula (X), the diisocyanate is 4,4'-methylene bis(cyclohexyl isocyanate) or 3-isocyanatomethyl-3,5,5-trimethyl-cyclohexylisocyanate.

In certain embodiments of any aspect, the surface modifying macromolecule is described by the structure of formula (XI):

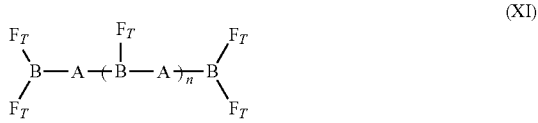

(XI)

where

A is hydrogenated polybutadiene (HLBH) (e.g., HLBH), polybutadiene (LBHP), hydrogenated polyisoprene (HHTPI), or polystyrene and has a theoretical molecular weight of from 750 to 3,500 Daltons (e.g., from 750 to 2,000 Daltons, from 1,000 to 2,500 Daltons, or from 1,000 to 3,500 Daltons);

B is a segment including an isocyanurate trimer or biuret trimer;

$F_T$ is a polyfluoroorgano group; and n is an integer from 0 to 10.

In particular embodiments of formula (XI), B is formed from a triisocyanate and a diol of A. In further embodiments of formula (XI), the triisocyanate is hexamethylene diisocyanate (HDI) biuret trimer. In other embodiments of formula (XI), the triisocyanate is hexamethylene diisocyanate (HDI) trimer. In yet other embodiments of formula (XI), the triisocyanate is isophorone diisocyanate (IPDI) trimer.

In further embodiments of any aspect, the surface modifying macromolecule is described by the structure of formula (XII):

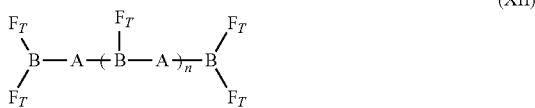

(XII)

where

A is a polyester having a theoretical molecular weight of from 500 to 3,500 Daltons (e.g., from 500 to 2,000 Daltons, from 1,000 to 2,000 Daltons, or from 1,000 to 3,000 Daltons);

B is a segment including an isocyanurate trimer or biuret trimer;

$F_T$ is a polyfluoroorgano group; and n is an integer from 0 to 10.

In some embodiments of formula (XII), B is formed from a triisocyanate and a diol of A. In other embodiments of formula (XII), the triisocyanate is hexamethylene diisocyanate (HDI) biuret trimer, isophorone diisocyanate (IPDI) trimer, and hexamethylene diisocyanate (HDI) trimer. In yet other embodiments of formula (XII), the triisocyanate is isophorone diisocyanate (IPDI) trimer. In still other embodiments of formula (XII), the polyester is poly(diethylene glycol)adipate, (neopentyl glycol-ortho phthalic anhydride) polyester, (diethylene glycol-ortho phthalic) anhydride polyester, or (1,6-hexanediol-ortho phthalic anhydride) polyester.

In certain embodiments of any aspect, the surface modifying macromolecule is compound 1, 2, 3, 4, 5, 6, 7, 8, 9, 10, 11, 12, 13, 14, 15, 16, 17, 18, 19, 20, 21, 22, 23, 24, 25, 26, 27, or 28.

Definitions

The term "base polymer," as used herein, refers to a polymer having a theoretical molecular weight of greater than or equal to 20 kDa (e.g., greater than or equal to 50 kDa, greater than or equal to 75 kDa, greater than or equal to 100 kDa, greater than or equal to 150 kDa, or greater than 200 kDa). The base polymer used in admixture with a surface-modifying macromolecule to form a layer within the packaging material of the invention is that which requires the presence of the surface-modifying macromolecule to gain the barrier properties.

The term "film," as used herein, refers to a single layer or a multilayer sheet of flexible material having a thickness of less than 0.5 mm.

The term "packaging material," as used herein, refers to a material that either alone or in combination with additional ingredients forms a container having properties acceptable for storing a pharmaceutical formulation, a biologic formulation, a food product, or a medical device. Acceptability of a packaging material has been characterized by the relevant governmental agencies (see, e.g., provisions related to food contact in Code of Federal Regulations, title 21; Container Closure Systems for Packaging Human Drugs and Biologics, *Guidance for Industry*, Food and Drug Administration, U.S. Department of Health and Human Services, May 1999; U.S. Pharmacopeia monograph <661>; Regulation EU 10/2011; or European Pharmacopoeia 3.1.11 and 3.2). The packaging materials include a single-layer or a multilayer film.

The term "polyalkylene," when used herein in reference to a base polymer, refers to a base polymer composed of linear or branched alkylene repeating units having from 2 to 4 carbon atoms and/or optionally a cyclic olefin of 3 to 10 carbon atoms (e.g., norbornene). In certain embodiments, polyalkylene is an acyclic alkylene composed of linear or branched alkylene repeating units having from 2 to 4 carbon atoms (e.g., an acyclic polyalkylene). Each alkylene repeating unit is optionally substituted with one substituent selected from the group consisting of chloro, methoxycarbonyl, ethoxycarbonyl, hydroxy, acetoxy, cyano, and phenyl. Polyalkylene base polymers can be a co-polymer (e.g., a EVA or EVOH). In particular embodiments, each repeating unit in polyalkylene is unsubstituted (e.g., a polyethylene or a polypropylene). Non-limiting examples of polyalkylene base polymers include polyethylene (e.g., LDPE or HDPE), polypropylene, hydrogenated polybutadiene, poly vinyl chloride, polystyrene, EVOH, EVA, a cyclic olefin polymer (COP), or a cyclic olefin copolymer (COC).

The term "barrier layer," as used herein, refers to a layer capable of reducing the diffusion of one or more types of small molecules through the packaging material. In packaging materials of the invention, this capability is provided by using an admixture of a surface-modifying macromolecule with a base polymer in manufacturing of the layer. The barrier layer may have barrier properties against small molecules, such as polar or non-polar small molecules having a molecular weight of less than 500 Da (e.g., oxygen, water vapor, alcohol vapor (e.g., methanol, ethanol, isopropanol, or butanol), or carbon dioxide). A non-limiting example of a small molecule is water; thus, a layer have barrier properties against water may be referred to as a moisture barrier layer. While a layer formed from a base polymer alone can have some barrier properties (e.g., against oxygen but not against water vapor), the inclusion of a surface-modifying macromolecule in this layer can provide additional barrier properties (e.g., against water vapor).

The term "surface-modifying macromolecule," as used herein, refers to a segmented compound of any one of formulae (I), (II), (III), (IV), (V), (VI), (VII), (VIII), (IX), (X), (XI), and (XII). One of skill in the art will recognize that these structural formulae represent idealized theoretical structures. Specifically, the segments are reacted in specific stoichiometries to furnish a surface-modifying macromolecule as a distribution of molecules having varying ratios of segments. Accordingly, the variable n in the in formulae (I)-(XII) indicates the theoretical stoichiometry of the segments.

For any term present in the art which is identical to any term expressly defined in this disclosure, the term's definition presented in this disclosure will control.

DETAILED DESCRIPTION

Figure 1:
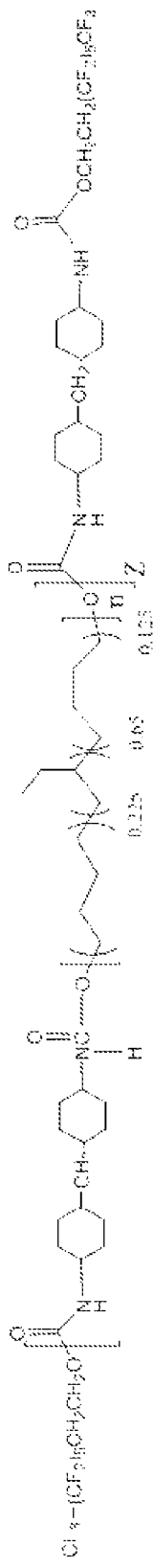
FIG. 1 shows a theoretical structure of Compound 1 (Z=2).

In general, the present invention relates to packaging materials including a film containing a barrier layer formed from an admixture containing a base polymer and a surface-modifying macromolecule. The use of surface-modifying macromolecules in the packaging materials of the invention can be advantageous for two reasons: (1) the need for inclusion of a layer solely for enhancing the barrier properties of the packaging material is negated, and (2) the surface-modifying macromolecule may lower the coefficient of friction of the layer, thereby allowing for higher processing speed. Thus, the packaging materials of the invention include a film having at least one multifunctional layer, in which the base polymer provides one function (e.g., maintenance of a shape of the packaging material of the invention) and the surface-modifying macromolecule provides an additional function (e.g., enhancement of barrier properties of the base polymer). Without being bound by a theory, the enhancement of barrier properties in a layer formed from an admixture of a base polymer and a surface-modifying macromolecule is due to the migration of the surface-modifying macromolecule to the surface of the layer.

The surface-modifying macromolecules can provide a base polymer with certain barrier properties that the base polymer otherwise lacks. Many base polymers are amenable to enhancement of the barrier properties by admixing the polymer with the surface-modifying macromolecule. Other base polymers that have acceptable barrier properties do not need admixing with surface-modifying macromolecules. Indeed, often these base polymers are used as dedicated barrier layers in multilayer films. Enhancing the barrier properties of other base polymers in a film using a surface-modifying macromolecule, thus, can help to eliminate the need for use of the base polymers solely for the purpose of providing the missing barrier properties. For example, PVdC is a base polymer that already possesses the requisite barrier properties (e.g., moisture barrier properties). However, processing PVdC is complicated by its corrosive effect on the manufacturing equipment. Therefore, surfaces contacting PVdC during manufacturing process must be protected by coating with PTFE, which increases the manufacturing costs. Thus, the use of surface-modifying macromolecules in admixture with a base polymer can remove the need for inclusion of a PVdC layer in a film used in a packaging material, thereby reducing the material expenditure and manufacturing complexity. Alternatively, in packaging applications requiring very high barrier properties (e.g., extremely low WVTR, OTR, or COTR), admixtures of base polymers (e.g., a barrier base polymer (e.g., a cyclic olefin copolymer (e.g., TOPAS®))) having barrier properties with the surface-modifying macromolecules may be used. Admixing a surface-modifying macromolecule with such barrier base polymer may enhance the desired barrier property (e.g., moisture barrier property) further. When very high barrier properties are desired in multilayer films (e.g., a bilayer, a trilayer, or a tetralayer film), the film may include a layer formed from a base polymer having high barrier properties (e.g., cyclic olefin copolymer, PVdC, or PCTFE) and a layer formed from another base polymer (e.g., a polyalkylene, a polyester, a polyamide, or a polysaccharide), provided that at least one layer in this multilayer film is formed from an admixture of a base polymer and a surface-modifying macromolecule. Thus, the selection of a base polymer for the packaging material of the invention can be carried out with the desired barrier property in mind.

Films, Packaging Materials, and Containers

The packaging materials of the invention may include films containing a barrier layer. The barrier layer can have acceptable barrier properties, such as moisture barrier properties (i.e., the layer reduces WVTR of the packaging material to an acceptable level), oxygen barrier properties (i.e., the layer reduces oxygen transmission rate (OTR) of the packaging material to an acceptable level), or carbon dioxide barrier properties (i.e., the layer reduces carbon dioxide transmission rate (COTR) of the packaging material to an acceptable level).

The films of the invention may be single-layer or multilayer and may be prepared according to methods known in the art, e.g., extrusion (e.g., melt extrusion or blown film extrusion), or calender rolling. In particular, the multilayer films may be prepared by extrusion laminating, extrusion coating, or co-extrusion. One of the layers in the film may be a layer formed from an admixture of a base polymer and a surface-modifying macromolecule.

The film alone can be a packaging material. Alternatively, a packaging material may be a combination of the film with other ingredients, e.g., a sheet material (e.g., cardboard or aluminum foil), handles, or a locking mechanism. Examples of locking mechanisms that can be included in the packaging materials of the invention are provided in U.S. Pat. Nos. 2,810,944; 7,029,178; and 5,138,750, the disclosures of which are incorporated herein by reference. The packaging material formed from a film of the invention and a sheet material may be prepared according to methods known in the art, e.g., lamination or extrusion coating.

Containers of the invention can be assembled from the packaging materials according to methods known in the art. For example, the packaging material may be formed into a pouch, a box, or an envelope. Additional elements may be added to the container, such as print (e.g., by offset printing) and/or labels affixed to the container with adhesives. The container can be a primary package or a secondary package. Preferably, the container is a flexible package (e.g., a pouch (e.g., a vacuum packaging bag) or a blister pack).

Surface Modifying Macromolecules

The surface-modifying macromolecules using in the packaging materials of the invention may be described by the structure of any one of formulae (I), (II), (III), (IV), (V), (VI), (VII), (VIII), (IX), (X), (XI), and (XII) shown below.

(1) Formula (I):

(I)

wherein
(i) A includes hydrogenated polybutadiene, poly((2,2-dimethyl)-1,3-propylene carbonate), polybutadiene, poly(diethylene glycol)adipate, poly(hexamethylene carbonate), poly(ethylene-co-butylene), (neopentyl glycol-ortho phthalic anhydride) polyester, (diethylene glycol-ortho phthalic anhydride) polyester, (1,6-hexanediol-ortho phthalic anhydride) polyester, or bisphenol A ethoxylate;
(ii) B is a segment including a urethane; and
(iii) $F_T$ is a polyfluoroorgano group, and
(iv) n is an integer from 1 to 10.

(2) Formula (II):

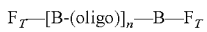

$$F_T—[B\text{-}(oligo)]_n—B—F_T \qquad (II)$$

wherein
(i) B includes a urethane;
(ii) oligo includes polypropylene oxide, polyethylene oxide, or polytetramethylene oxide;
(iii) $F_T$ is a polyfluoroorgano group; and
(iv) n is an integer from 1 to 10.

(3) Formula (III) or Formula (IV):

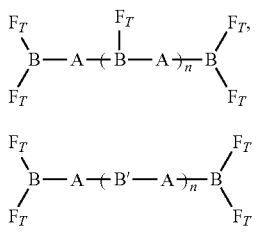

(III)

(IV)

wherein
(i) A is an oligomeric segment containing an ether linkage, an ester linkage, a carbonate linkage, or a polyalkylene and having a theoretical molecular weight of from 500 to 5,000 Daltons (e.g., from 500 to 3,500 Daltons, from 500 to 2,000 Daltons, from 1,000 to 2,000 Daltons, or from 1,000 to 3,000 Daltons);
(ii) B is a segment including a isocyanurate trimer or biuret trimer; B', when present, is a hard segment including a urethane;
(iii) each $F_T$ is a polyfluoroorgano group; and
(iv) n is an integer between 0 to 10.

(4) Formula (V):

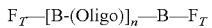

$$F_T—[B\text{-}(Oligo)]_n—B—F_T \qquad (V)$$

wherein
(i) Oligo is an oligomeric segment including polypropylene oxide, polyethylene oxide, or polytetramethyleneoxide and having a theoretical molecular weight of from 500 to 5,000 Daltons (e.g., from 500 to 3,000 Daltons, from 500 to 2,000 Daltons, from 1,000 to 2,000 Daltons, or from 1,000 to 3,000 Daltons);
(ii) B is a segment formed from a diisocyanate;
(iii) $F_T$ is a polyfluoroorgano group; and
(iv) n is an integer from 1 to 10.

(5) Formula (VI):

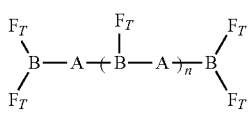

(VI)

wherein
(i) A is an oligomeric segment including polyethylene oxide, polypropylene oxide, polytetramethylene oxide, or a mixture thereof, and having a theoretical molecular weight of from 500 to 5,000 Daltons (e.g., from 500 to 3,000 Daltons, from 500 to 2,000 Daltons, from 1,000 to 2,000 Daltons, or from 1,000 to 3,000 Daltons);
(ii) B is a hard segment including an isocyanurate trimer or biuret trimer;
(iii) $F_T$ is a polyfluoroorgano group; and
(iv) n is an integer from 0 to 10.

(6) Formula (VII):

$$F_T—[B\text{-}(Oligo)]_n—B—F_T \qquad (VII)$$

wherein
(i) Oligo is a polycarbonate polyol having a theoretical molecular weight of from 500 to 5,000 Daltons (e.g., from 500 to 3,000 Daltons, from 500 to 2,000 Daltons, from 1,000 to 2,000 Daltons, or from 1,000 to 3,000 Daltons);
(ii) B is a segment formed from a diisocyanate;
(iii) $F_T$ is a polyfluoroorgano group; and
(iv) n is an integer from 1 to 10.

(7) Formula (VIM):

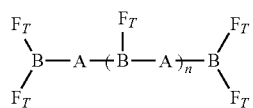

(VIII)

wherein
(i) A is an oligomeric segment including a polycarbonate polyol having a theoretical molecular weight of from 500 to 5,000 Daltons (e.g., from 500 to 3,000 Daltons, from 500 to 2,000 Daltons, from 1,000 to 2,000 Daltons, or from 1,000 to 3,000 Daltons);
(ii) B is a segment including an isocyanurate trimer or biuret trimer;
(iii) $F_T$ is a polyfluoroorgano group; and
(iv) n is an integer from 0 to 10.

(8) Formula (IX):

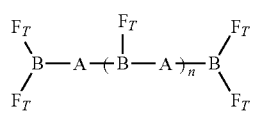

(IX)

wherein
(i) A includes a first block segment selected from polypropylene oxide, polyethylene oxide, polytetramethyleneoxide, or a mixture thereof, and a second block segment including a polysiloxane or polydimethylsiloxane, wherein A has a theoretical molecular weight of from 500 to 5,000 Daltons (e.g., from 1,000 to 5,000 Daltons, from 1,000 to 3,000 Daltons, from 2,000 to 5,000 Daltons, or from 2,500 to 5,000 Daltons);
(ii) B is a segment including an isocyanurate trimer or biuret trimer;
(iii) $F_T$ is a polyfluoroorgano group; and
(iv) n is an integer from 0 to 10.

(9) Formula (X):

$$F_T\text{—}[B\text{-}A]_n\text{—}B\text{—}F_T \quad (X)$$

wherein
(i) A is a segment selected from the group consisting of hydrogenated polybutadiene (HLBH) (e.g., HLBH), polybutadiene (LBHP) (e.g., LBHP), hydrogenated polyisoprene (HHTPI) (e.g., HHTPI), and polystyrene and has a theoretical molecular weight of from 750 to 3,500 Daltons (e.g., from 750 to 2,000 Daltons, from 1,000 to 2,500 Daltons, or from 1,000 to 3,500 Daltons);
(ii) B is a segment formed from a diisocyanate;
(iii) $F_T$ is a polyfluoroorgano group; and
(iv) n is an integer from 1 to 10.

(10) Formula (XI):

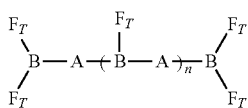

(XI)

wherein
(i) A is hydrogenated polybutadiene (HLBH) (e.g., HLBH), polybutadiene (LBHP), hydrogenated polyisoprene (HHTPI), or polystyrene and has a theoretical molecular weight of from 750 to 3,500 Daltons (e.g., from 750 to 2,000 Daltons, from 1,000 to 2,500 Daltons, or from 1,000 to 3,500 Daltons);
(ii) B is a segment including an isocyanurate trimer or biuret trimer;
(iii) $F_T$ is a polyfluoroorgano group; and
(iv) n is an integer from 0 to 10.

(11) Formula (XII):

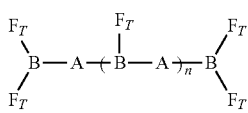

(XII)

wherein
(i) A is a polyester having a theoretical molecular weight of from 500 to 3,500 Daltons (e.g., from 500 to 2,000 Daltons, from 1,000 to 2,000 Daltons, or from 1,000 to 3,000 Daltons);
(ii) B is a segment including an isocyanurate trimer or biuret trimer;
(iii) $F_T$ is a polyfluoroorgano group; and
(iv) n is an integer from 0 to 10.

The surface modifying macromolecule of formula (I) can include B formed from a diisocyanate selected from 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; and hexamethylene diisocyanate. The variable n may be 1 or 2. In certain embodiments, A is hydrogenated polybutadiene or poly((2,2-dimethyl)-1,3-propylene carbonate), and B is formed from 4,4'-methylene bis(cyclohexyl isocyanate). The surface modifying macromolecule of formula (I) may be used in admixture with a base polymer (e.g., polyalkylene (e.g., polyethylene, polypropylene, polyvinyl chloride, ethylene vinyl alcohol (EVOH), or polystyrene), polyester (e.g., poly(ethylene terephthalate) or polylactide), polyamide (e.g., PA6), or a polysaccharide (e.g., cellulose or cellulose acetate) to form a barrier layer (e.g., a moisture barrier layer) in the packaging materials of the invention. In some embodiments (e.g., embodiments related to pharmaceutical packaging materials), the surface modifying macromolecule of formula (I) (e.g., a compound of formula (I), in which A is hydrogenated polybutadiene or poly((2,2-dimethyl)-1,3-propylene carbonate), and B is formed from 4,4'-methylene bis(cyclohexyl isocyanate)) can be used in admixture with a base polymer, such as a polyethylene, a polypropylene, a polyvinyl chloride, or EVOH, to form a film (e.g., a monolayer or a bilayer) for a packaging material of the invention. In other embodiments (e.g., embodiments related to food packaging materials), the surface modifying macromolecule of formula (I) (e.g., a compound of formula (I), in which A is hydrogenated polybutadiene or poly((2,2-dimethyl)-1,3-propylene carbonate), and B is formed from 4,4'-methylene bis(cyclohexyl isocyanate)) can be used in admixture with a base polymer, such as a polyethylene, a polypropylene, a polyvinyl chloride, polystyrene, EVOH, polyethylene terephthalate, polylactide, or cellulose, to form a film (e.g., a monolayer or a bilayer) for a packaging material of the invention.

The surface modifying macromolecule of formulae (III) and (IV) can include A that is an oligomeric segment containing hydrogenated polybutadiene (HLBH), poly((2,2-dimethyl)-1,3-propylene carbonate) (PCN), polybutadiene (LBHP), polytetramethylene oxide (PTMO), polypropylene oxide (PPO), (diethyleneglycol-orthophthalic anhydride) polyester (PDP), hydrogenated polyisoprene (HHTPI), poly(hexamethylene carbonate) (PHCN), poly((2-butyl-2-ethyl)-1,3-propylene carbonate), or A can be formed from hydroxylterminated polydimethylsiloxane (C22) or 1,12-dodecanediol. In the surface modifying macromolecule of formulae (III) and (IV), B is formed by reacting a triisocyanate (e.g., hexamethylene diisocyanate (HDI) biuret trimer, isophorone diisocyanate (IPDI) trimer, or hexamethylene diisocyanate (HDI) trimer) with a diol including the oligomeric segment A.

In the surface modifying macromolecule of formula (V), B may be a segment formed from 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; and hexamethylene diisocyanate. The variable n may be an integer from 1 to 3.

In the surface modifying macromolecule of formula (VI), B is a segment formed by reacting a triisocyanate with a diol of A. The triisocyanate may be hexamethylene diisocyanate (HDI) biuret trimer, isophorone diisocyanate (IPDI) trimer, or hexamethylene diisocyanate (HDI) trimer. The variable n may be 0, 1, 2, or 3.

In the surface modifying macromolecule of formula (VII), Oligo can include poly((2,2-dimethyl)-1,3-propylene carbonate) (PCN). B may be a segment formed from 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; and hexamethylene diisocyanate. The variable n may be 1, 2, or 3. The surface modifying macromolecules of formula (VII) may be used in admixture with a base polymer (e.g., polyalkylene (e.g., polyethylene, polypropylene, polyvinyl chloride, ethylene vinyl alcohol (EVOH), or polystyrene), polyester (e.g., poly(ethylene terephthalate) or polylactide), polyamide (e.g., PA6), or a polysaccharide (e.g., cellulose or cellulose acetate) to form a barrier layer (e.g., a moisture barrier layer) in the packaging materials of the invention.

In the surface modifying macromolecule of formula (VIII), B is a segment formed by reacting a triisocyanate with a diol of A (e.g., the oligomeric segment). The triisocyanate may be hexamethylene diisocyanate (HDI) biuret trimer, isophorone diisocyanate (IPDI) trimer, or hexamethylene diisocyanate (HDI) trimer. The segment A can include poly((2,2-dimethyl)-1,3-propylene carbonate) (PCN) or poly(hexamethylene carbonate) (PHCN). The variable n may be 0, 1, 2, or 3. The surface modifying macromolecules of formula (VIII) may be used in admixture with a base polymer (e.g., polyalkylene (e.g., polyethylene, polypropylene, polyvinyl chloride, ethylene vinyl alcohol (EVOH), or polystyrene), polyester (e.g., poly(ethylene terephthalate) or polylactide), polyamide (e.g., PA6), or a polysaccharide (e.g., cellulose or cellulose acetate) to form a barrier layer (e.g., a moisture barrier layer) in the packaging materials of the invention.

In the surface modifying macromolecule of formula (IX), B is a hard segment formed by reacting a triisocyanate with a diol of A. In segment A, the number of first block segments and second block segments can be any integer or non-integer to provide the approximate theoretical molecule weight of the soft segment. The segment A can include polypropylene oxide and polydimethylsiloxane. The triisocyanate may be hexamethylene diisocyanate (HDI) biuret trimer, isophorone diisocyanate (IPDI) trimer, or hexamethylene diisocyanate (HDI) trimer. The variable n may be 0, 1, 2, or 3. The surface modifying macromolecules of formula (IX) may be used in admixture with a base polymer (e.g., polyalkylene (e.g., polyethylene, polypropylene, polyvinyl chloride, ethylene vinyl alcohol (EVOH), or polystyrene), polyester (e.g., poly(ethylene terephthalate) or polylactide), polyamide (e.g., PA6), or a polysaccharide (e.g., cellulose or cellulose acetate) to form a barrier layer (e.g., a moisture barrier layer) in the packaging materials of the invention.

In surface modifying macromolecule of formula (X), B is a segment formed from a diisocyanate and a diol including segment A. The segment A can include hydrogenated polybutadiene. The segment B may be formed from 3-isocyanatomethyl-3,5,5-trimethyl-cyclohexylisocyanate; 4,4'-methylene bis(cyclohexyl isocyanate); 4,4'-methylene bis(phenyl isocyanate); toluene-2,4-diisocyanate; m-tetramethylxylene diisocyanate; or hexamethylene diisocyanate. The variable n may be 1, 2, or 3. The surface modifying macromolecules of formula (X) may be used in admixture with a base polymer (e.g., polyalkylene (e.g., polyethylene, polypropylene, polyvinyl chloride, ethylene vinyl alcohol (EVOH), or polystyrene), polyester (e.g., poly(ethylene terephthalate) or polylactide), polyamide (e.g., PA6), or a polysaccharide (e.g., cellulose or cellulose acetate) to form a barrier layer (e.g., a moisture barrier layer) in the packaging materials of the invention.

In the surface modifying macromolecule of formula (XI), B is a segment formed by reacting a triisocyanate with a diol of A. The segment A may be hydrogenated polybutadiene (HLBH) or hydrogenated polyisoprene (HHTPI). The triisocyanate may be hexamethylene diisocyanate (HDI) biuret trimer, isophorone diisocyanate (IPDI) trimer, or hexamethylene diisocyanate (HDI) trimer. The variable n may be 0, 1, 2, or 3. The surface modifying macromolecules of formula (XI) may be used in admixture with a base polymer (e.g., polyalkylene (e.g., polyethylene, polypropylene, polyvinyl chloride, ethylene vinyl alcohol (EVOH), or polystyrene), polyester (e.g., poly(ethylene terephthalate) or polylactide), polyamide (e.g., PA6), or a polysaccharide (e.g., cellulose or cellulose acetate) to form a barrier layer (e.g., a moisture barrier layer) in the packaging materials of the invention.

In the surface modifying macromolecule of formula (XII), B is a segment formed by reacting a triisocyanate with a diol of A (e.g., polyester). The segment A may be poly(diethylene glycol)adipate, (neopentyl glycol-ortho phthalic anhydride) polyester, (diethylene glycol-ortho phthalic) anhydride polyester, or (1,6-hexanediol-ortho phthalic anhydride) polyester. The triisocyanate may be hexamethylene diisocyanate (HDI) biuret trimer, isophorone diisocyanate (IPDI) trimer, and hexamethylene diisocyanate (HDI) trimer. The variable n may be 0, 1, 2, or 3. The surface modifying macromolecules of formula (XII) may be used in admixture with a base polymer (e.g., polyalkylene (e.g., polyethylene, polypropylene, polyvinyl chloride, ethylene vinyl alcohol (EVOH), or polystyrene), polyester (e.g., poly(ethylene terephthalate) or polylactide), polyamide (e.g., PA6), or a polysaccharide (e.g., cellulose or cellulose acetate) to form a barrier layer (e.g., a moisture barrier layer) in the packaging materials of the invention.

For any of the surface modifying macromolecules of the invention formed from a diisocyanate, the diisocyanate may be 3-isocyanatomethyl-3,5,5-trimethyl-cyclohexyliisocyanate; 4,4'-methylene bis(cyclohexyl isocyanate) (HMDI); 2,2'-, 2,4'-, and 4,4'-methylene bis(phenyl isocyanate) (MDI); toluene-2,4-diisocyanate; aromatic aliphatic isocyanate, such 1,2-, 1,3-, and 1,4-xylene diisocyanate; meta-tetramethylxylene diisocyanate (m-TMXDI); para-tetramethylxylene diisocyanate (p-TMXDI); hexamethylene diisocyanate (HDD; ethylene diisocyanate; propylene-1,2-diisocyanate; tetramethylene diisocyanate; tetramethylene-1,4-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-dimethylcyclohexane diisocyanate; 2,6-dimethylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane; 4,4'-bis(isocyanatomethyl)dicyclohexane; 2,4'-bis(isocyanatomethyl)dicyclohexane; isophoronediisocyanate (IPDI); 2,4-hexahydrotoluene diisocyanate; 2,6-hexahydrotoluene diisocyanate; 3,3'-dimethyl-4,4'-biphenylene diisocyanate (TODD; polymeric MDI; carbodiimide-modified liquid 4,4'-diphenylmethane diisocyanate; para-phenylene diisocyanate (PPDI); meta-phenylene diisocyanate (MPDI); naphthylene-1,5-diisocyanate; 2,4'-, 4,4'-, or 2,2'-biphenyl diisocyanate; polyphenyl polymethylene polyisocyanate (PMDI); mixtures of MDI and PMDI; mixtures of PMDI and TDI; dimerized uretdione of any isocyanate described herein, such as uretdione of toluene diisocyanate, uretdione of hexamethylene diisocyanate, or a mixture thereof; or a substituted or isomeric mixture thereof.

For any of the surface modifying macromolecules of the invention formed from an isocyanate trimer, the isocyanate trimer can be hexamethylene diisocyanate (HDI) biuret or trimer, isophorone diisocyanate (IPDI) trimer, hexamethylene diisocyanate (HDI) trimer; 2,2,4-trimethyl-1,6-hexane diisocyanate (TMDI) trimer; a trimerized isocyanurate of any isocyanates described herein, such as isocyanurate of toluene diisocyanate, trimer of diphenylmethane diisocyanate, trimer of tetramethylxylene diisocyanate, or a mixture thereof; a trimerized biuret of any isocyanates described herein; modified isocyanates derived from the above diisocyanates; or a substituted or isomeric mixture thereof.

The surface modifying macromolecule can include the group $F_T$ that is a polyfluoroalkyl having a theoretical molecular weight of between 100-1,500 Da. For example, $F_T$ may be $CF_3(CF_2)_rCH_2CH_2$— wherein r is 2-20, and $CF_3(CF_2)_s(CH_2CH_2O)_\chi$, where $\chi$ is 1-10 and s is 1-20. Alternatively, $F_T$ may be $CH_mF_{(3-m)}(CF_2)_rCH_2CH_2$— or $CH_mF_{(3-m)}(CF_2)_s(CH_2CH_2O)_\chi$—, where m is 0, 1, 2, or 3; $\chi$ is an integer between 1-10; r is an integer between 2-20; and s is an integer between 1-20. In certain embodiments, $F_T$ is 1H,1H,2H,2H-perfluoro-1-decanol; 1H,1H,2H,2H-perfluoro-1-octanol; 1H,1H,5H-perfluoro-1-pentanol; or 1H,1H-perfluoro-1-butanol, or a mixture thereof. In particular embodiments, $F_T$ is $(CF_3)(CF_2)_5CH_2CH_2O$—, $(CF_3)(CF_2)_7CH_2CH_2O$—, $(CF_3)(CF_2)_5CH_2CH_2O$—, $CHF_2(CF_2)_3CH_2O$—, or $(CF_3)(CF_2)_2CH_2O$—.

The surface-modifying macromolecules can be prepared according to methods described herein or in U.S. Pat. No. 6,127,507, or in the U.S. pre-grant publication Nos. 2008/0228253 and 2012/0148774; the disclosures of which are incorporated herein in their entirety.

Other Uses

While the invention described above is related to packaging materials in relation to packaging pharmaceutical and food products, the invention also features "specialty chemical packaging" or "electronic barrier films."

Specialty chemical packaging materials are the materials including a film containing a barrier layer formed from an admixture of a base polymer and a surface-modifying macromolecule. The films in specialty chemical packaging materials of the invention may have barrier properties against reactive atmospheric gases (e.g., water vapor, oxygen, or carbon dioxide) or a compound, which is intended to be stored in a container formed from the specialty chemical packaging. Unlike the packaging materials of the invention that can be used for pharmaceutical and food packaging, the specialty chemical packaging material (e.g., a layer within the specialty chemical packaging material) is not required to be acceptable for use as a pharmaceutical or food packaging. Instead, the specialty chemical packaging material of the invention can be that material which is inert to the compound stored in the container formed from the specialty chemical packaging material and has the barrier properties against this compound. When the stored compound is a compound that is reactive with atmospheric gases, such as water, oxygen, or carbon dioxide, the specialty chemical packaging material (e.g., a layer within the specialty chemical packaging material) of the invention may also have barrier properties against the atmospheric gas (e.g., moisture barrier properties, oxygen barrier properties, or carbon dioxide barrier properties). The base polymers that may be used in the specialty chemical packaging materials are same as those described above. The preparation of specialty chemical packaging materials and films therefor can be performed using methods described herein.

Electronic barrier film is the film containing a barrier layer formed from an admixture of a base polymer and a surface-modifying macromolecule. The electronic barrier film can be used to secure an oily product (e.g., an insulating oil, such as a refined mineral oil) on or in proximity of an electronic device or a portion thereof. Additionally or alternatively, the electronic barrier films can be used to decrease the exposure of an electronic device (e.g., a semiconductor) or a portion thereof to the environmental hazards, such as moisture or oxygen. The electronic barrier films of the invention may have barrier properties against atmospheric gases (e.g., water vapor, oxygen, or carbon dioxide) or oil (e.g., a hydrocarbon or a fatty acid ester). Unlike the packaging materials of the invention that can be used for pharmaceutical and food packaging, the electronic barrier film (e.g., a layer within the electronic barrier film) is not required to be acceptable for use as a pharmaceutical or food packaging. Instead, the electronic barrier film of the invention can be that material which the barrier properties against long chain hydrocarbons (e.g., hydrocarbon having more than 6 carbon atoms) and/or fatty acid esters and/or certain atmospheric gases (e.g., water vapor, oxygen, or carbon dioxide). The base polymers that may be used in the electronic barrier films of the invention are same as those described above. The preparation of electronic barrier films of the invention can be performed using methods described herein.

The following examples are meant to illustrate the invention. They are not meant to limit the invention in any way.

EXAMPLES

Surface-modifying macromolecules of any one of formulae (I), (II), (III), (IV), (V), (VI), (VII), (VIII), (IX), (X), (XI), and (XII) can be prepared as described in U.S. Pat. Nos. 6,127,507; 8,071,683; and 8,318,867; and in U.S. pre-grant publication Nos. 2008/0228253 and 2012/0148774. FIGS. 1-22 show exemplary surface-modifying macromolecules that were prepared in accordance with procedures described herein or in U.S. Pat. Nos. 6,127,507; 8,071,683; and 8,318,867; and in U.S. pre-grant publication Nos. 2008/0228253 and 2012/0148774.

Example 1—Preparation of Surface Modifying Macromolecules

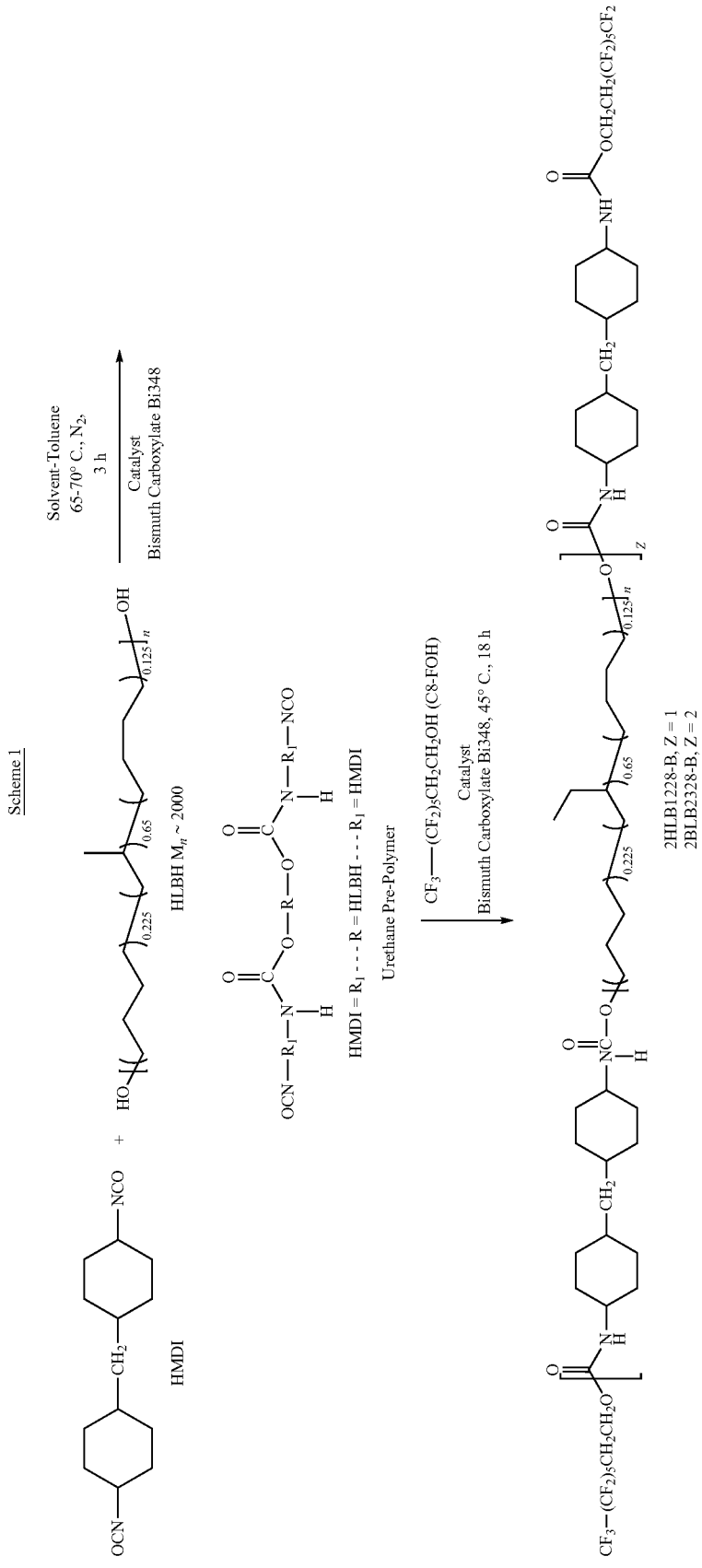

Compound 4:

all glassware used for the synthesis was dried in an oven at 110° C. overnight. To a 3-necked 1000 ml oven dried flask equipped with a stir bar was added 175 g (72 mmol) of hydrogenated-hydroxyl terminated polybutadiene (HLBH diol, MW=2000). The flask with the diol was degassed overnight and then purged with dry $N_2$. A 1000 mL graduated cylinder was filled with 525 mL anhydrous toluene, sealed by a rubber septa and purged with dry $N_2$. The toluene was transferred to the 3-necked flask via a double-edged needle and the diol stirred vigorously to dissolve in the solvent. The flask was placed in an oil bath at 65-70° C. At this time, 39.70 g (151 mmol) of 4,4'-methylene bis(cyclohexyl isocyanate) (HMDI) was added to a degassed 250 ml flask equipped with a stir bar. To this flask was added 150 ml of anhydrous Toluene from a degassed, $N_2$ purged 250 ml septa-sealed cylinder also using a double-edged needle and the mixture was stirred to dissolve the HMDI in the solvent.

To a degassed 50 ml round bottom flask was added 8.75 g (5.00% w/w based on diol) of the bismuth carboxylate catalyst followed by 26 ml of toluene to dissolve the catalyst. The HMDI solution was transferred to the 1000 ml flask containing the diol using a double-edged needle. The bismuth catalyst solution was added (20 ml) immediately following the addition of the HMDI. The reaction mixture was allowed to stir for 5 h at 70° C. to produce a HMDI-HLBH prepolymer.

Figure 3A:
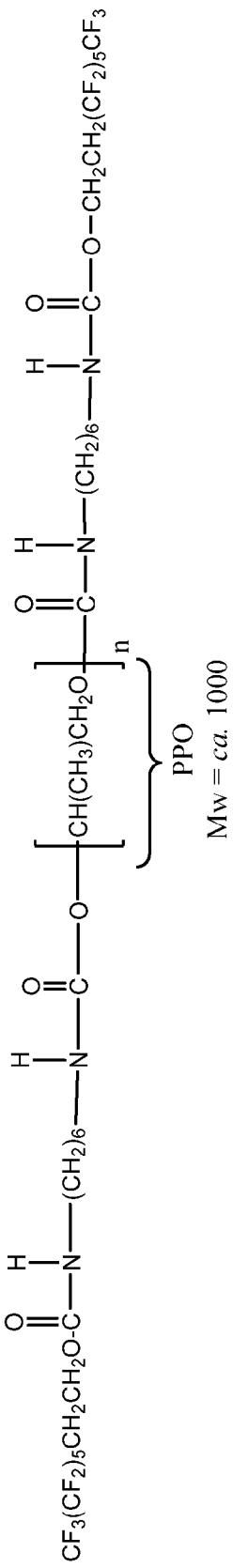
FIG. 3A shows a theoretical structure of Compound 3.
Figure 3B:
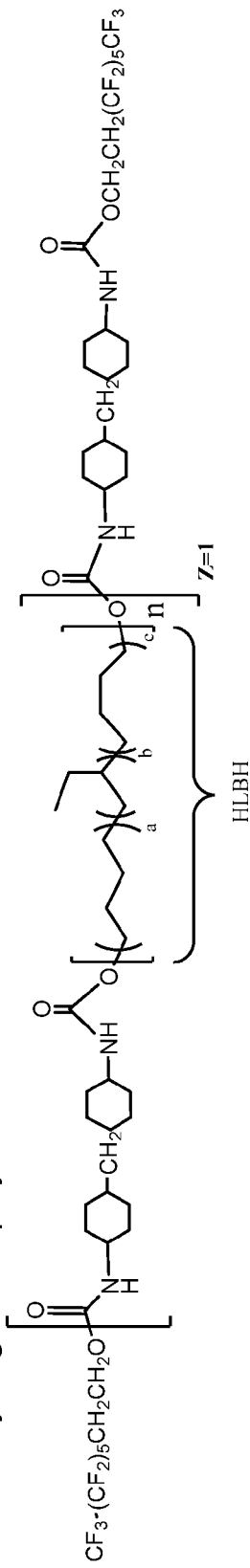
FIG. 3B shows a theoretical structure of Compound 4.
Figure 4A:
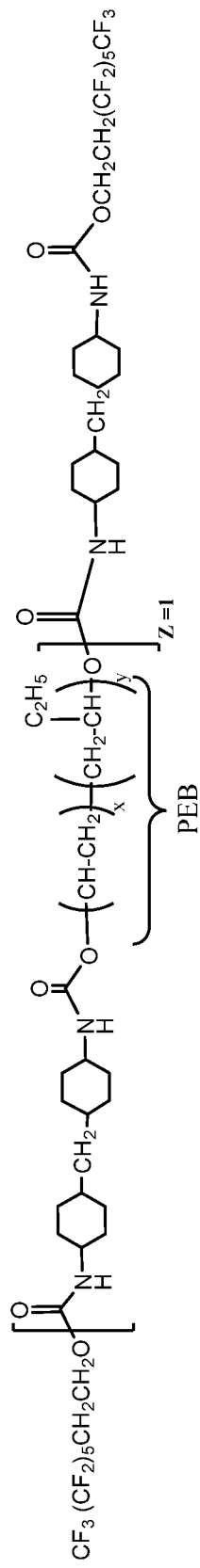
FIG. 4A shows a theoretical structure of Compound 5.
Figure 4B:
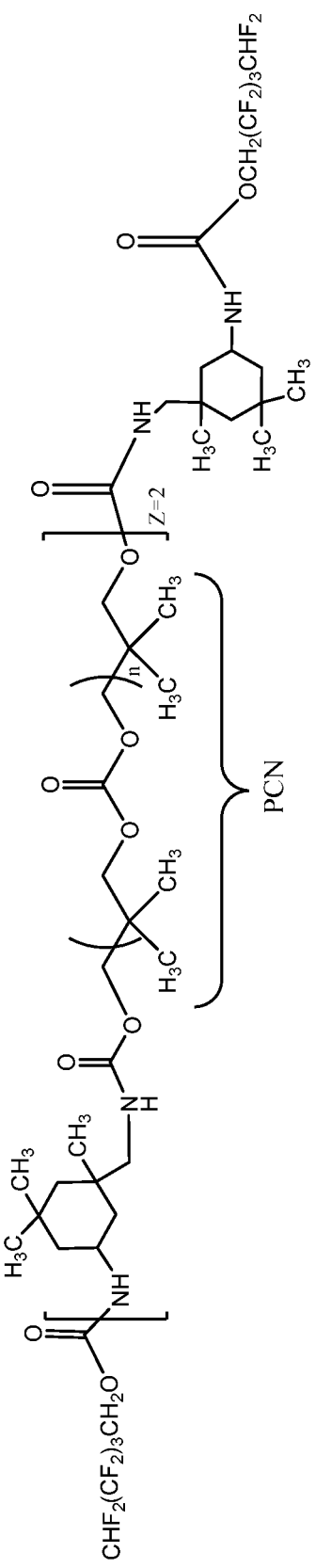
FIG. 4B shows a theoretical structure of Compound 6.
Figure 5A:
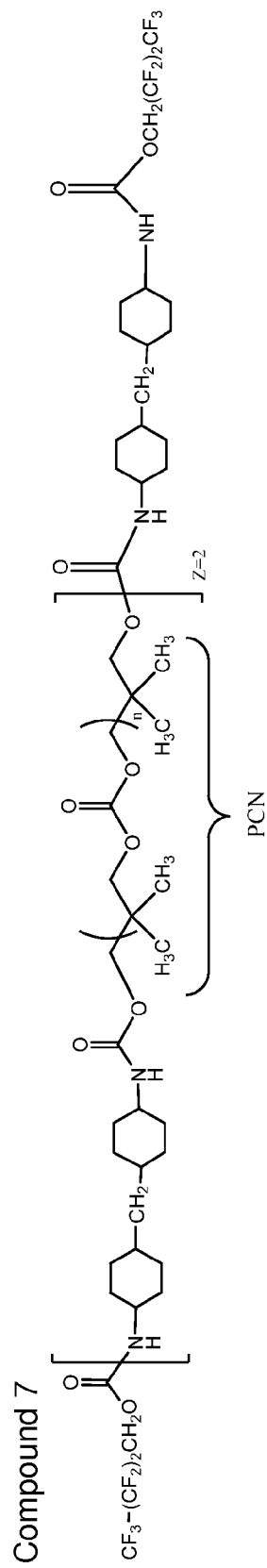
FIG. 5A shows a theoretical structure of Compound 7.
Figure 5B:
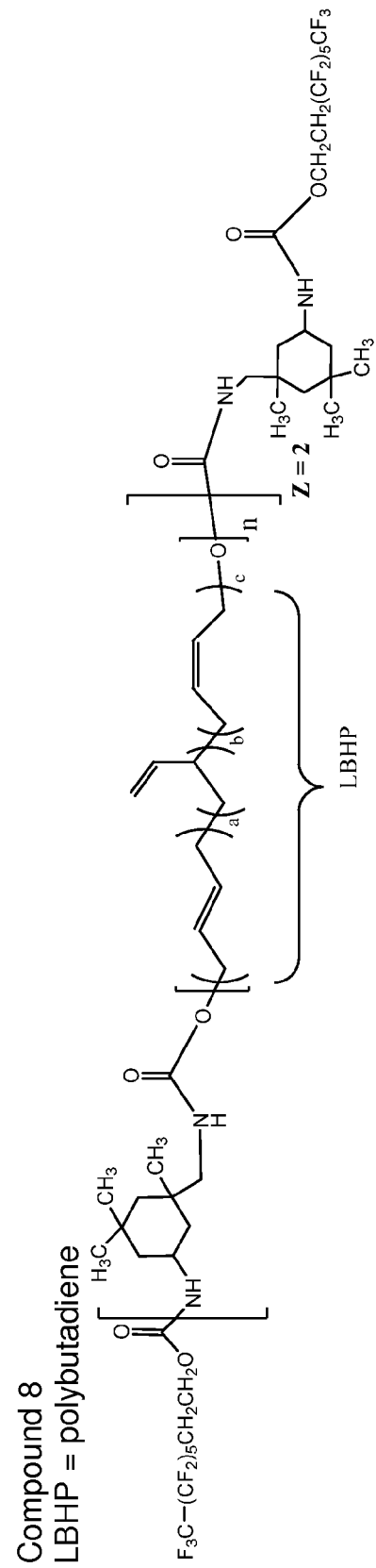
FIG. 5B shows a theoretical structure of Compound 8.
Figure 6A:
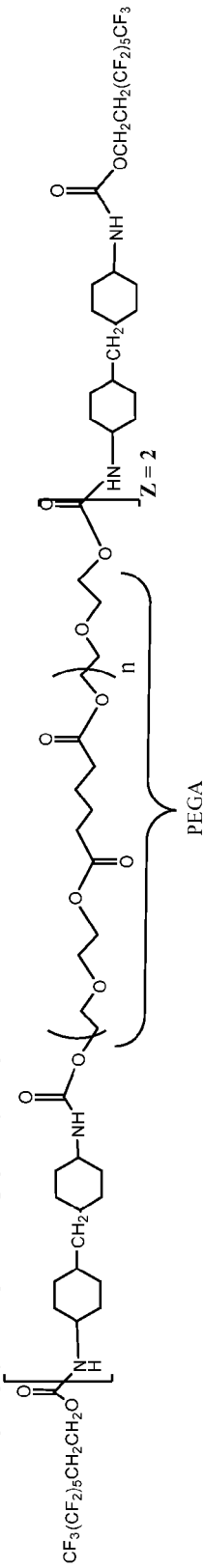
FIG. 6A shows a theoretical structure of Compound 9.
Figure 6B:
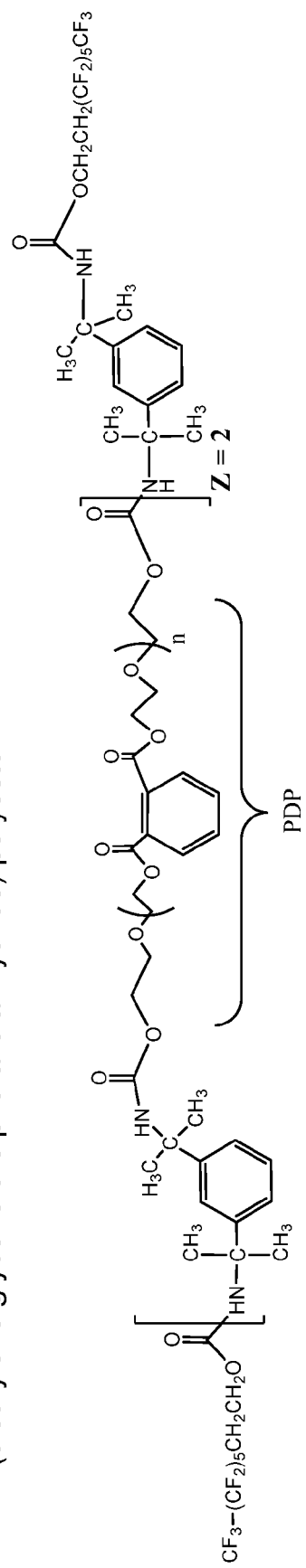
FIG. 6B shows a theoretical structure of Compound 10.
Figure 7A:
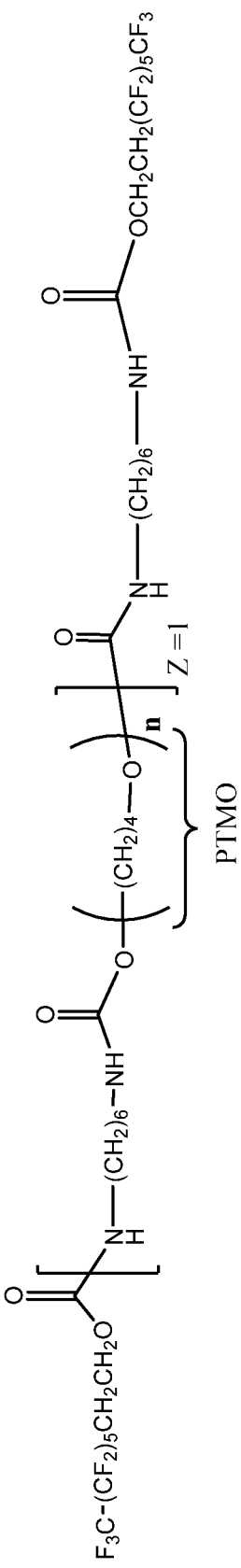
FIG. 7A shows a theoretical structure of Compound 11.
Figure 7B:
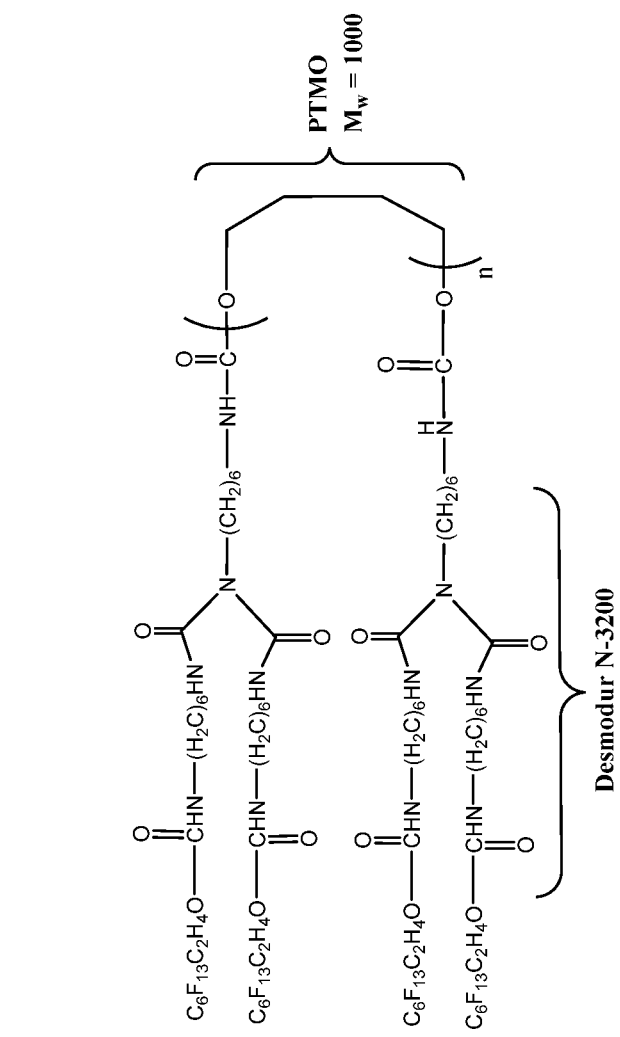
FIG. 7B shows a theoretical structure of Compound 12.
Figure 8:
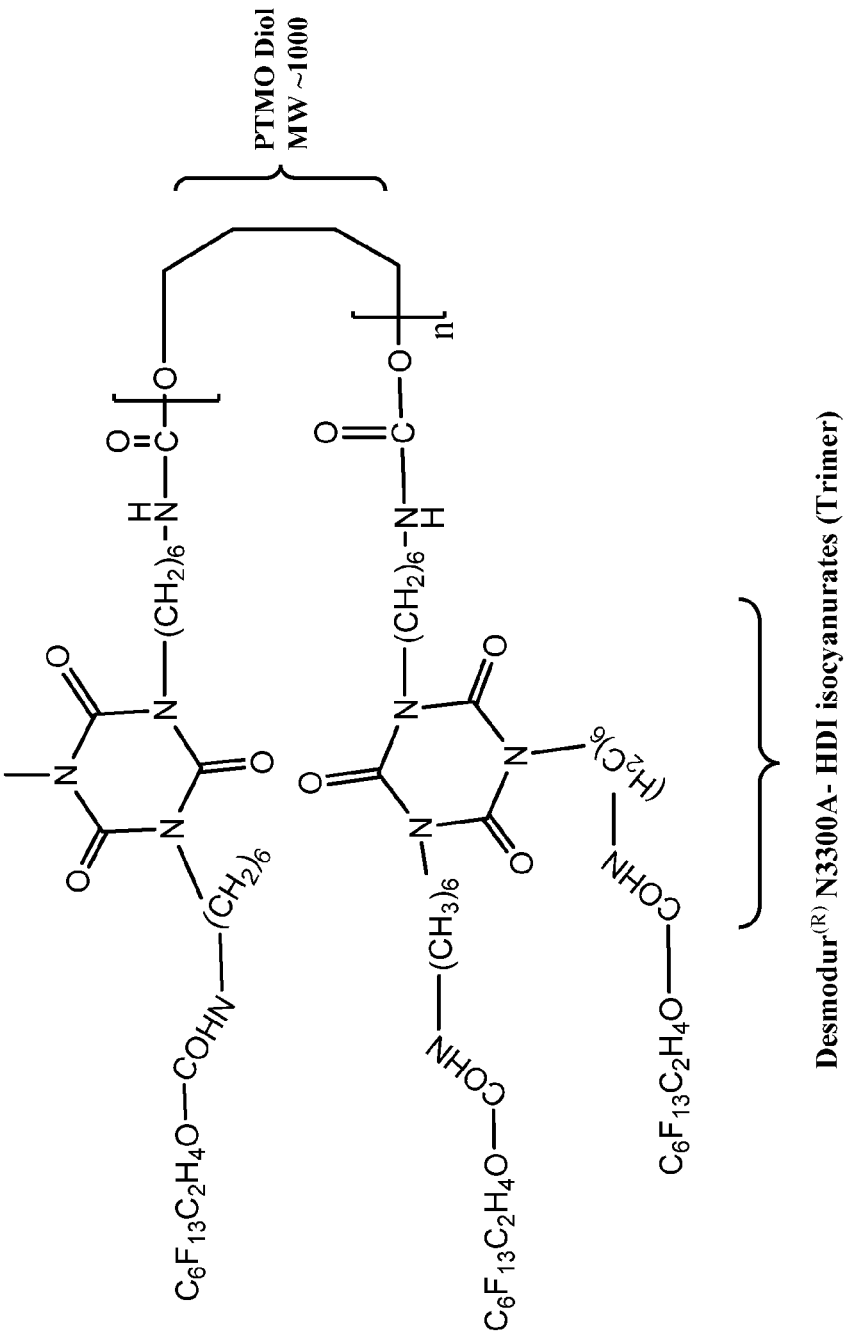
FIG. 8 shows a theoretical structure of Compound 13.
Figure 9:
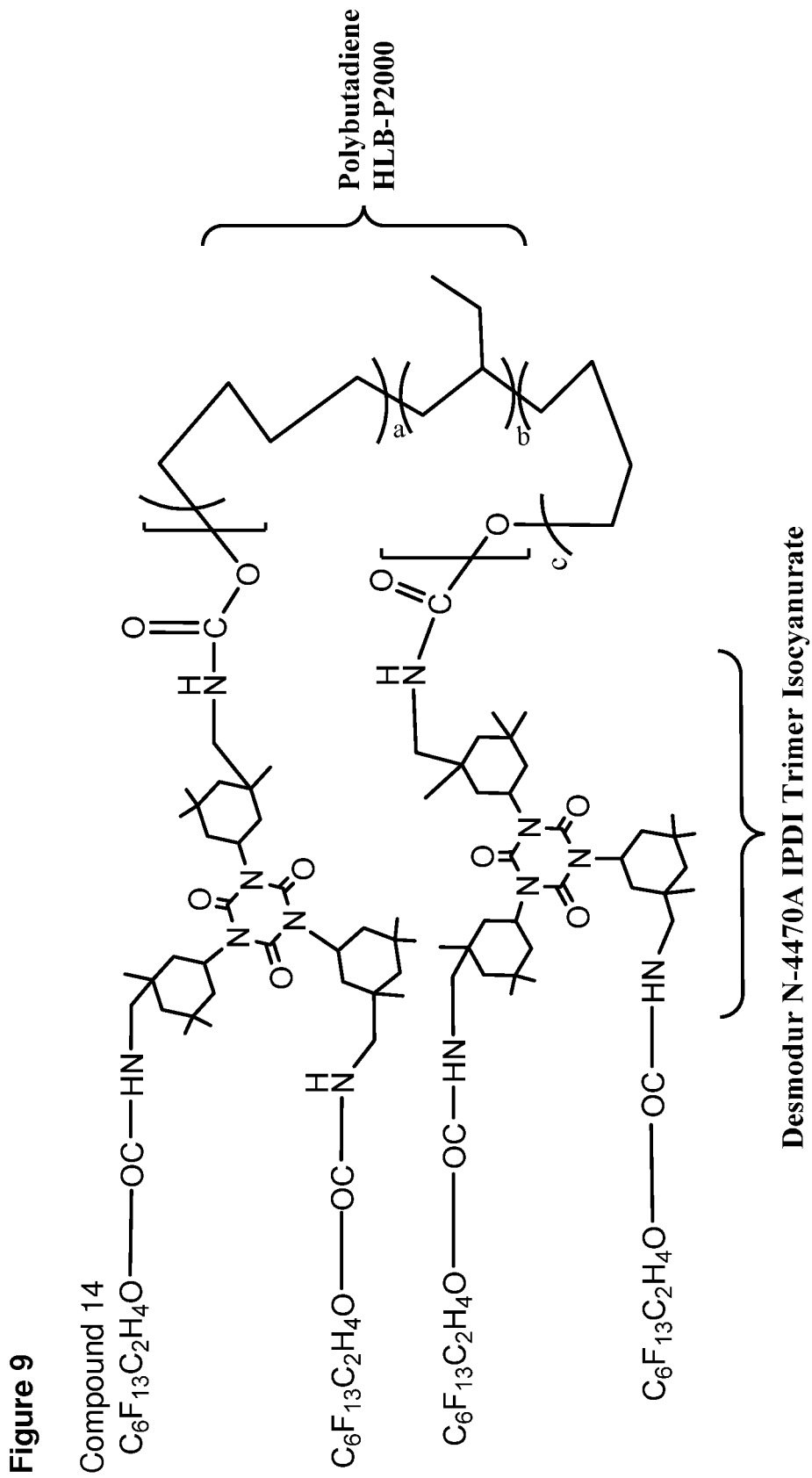
FIG. 9 shows a theoretical structure of Compound 14.
Figure 10:
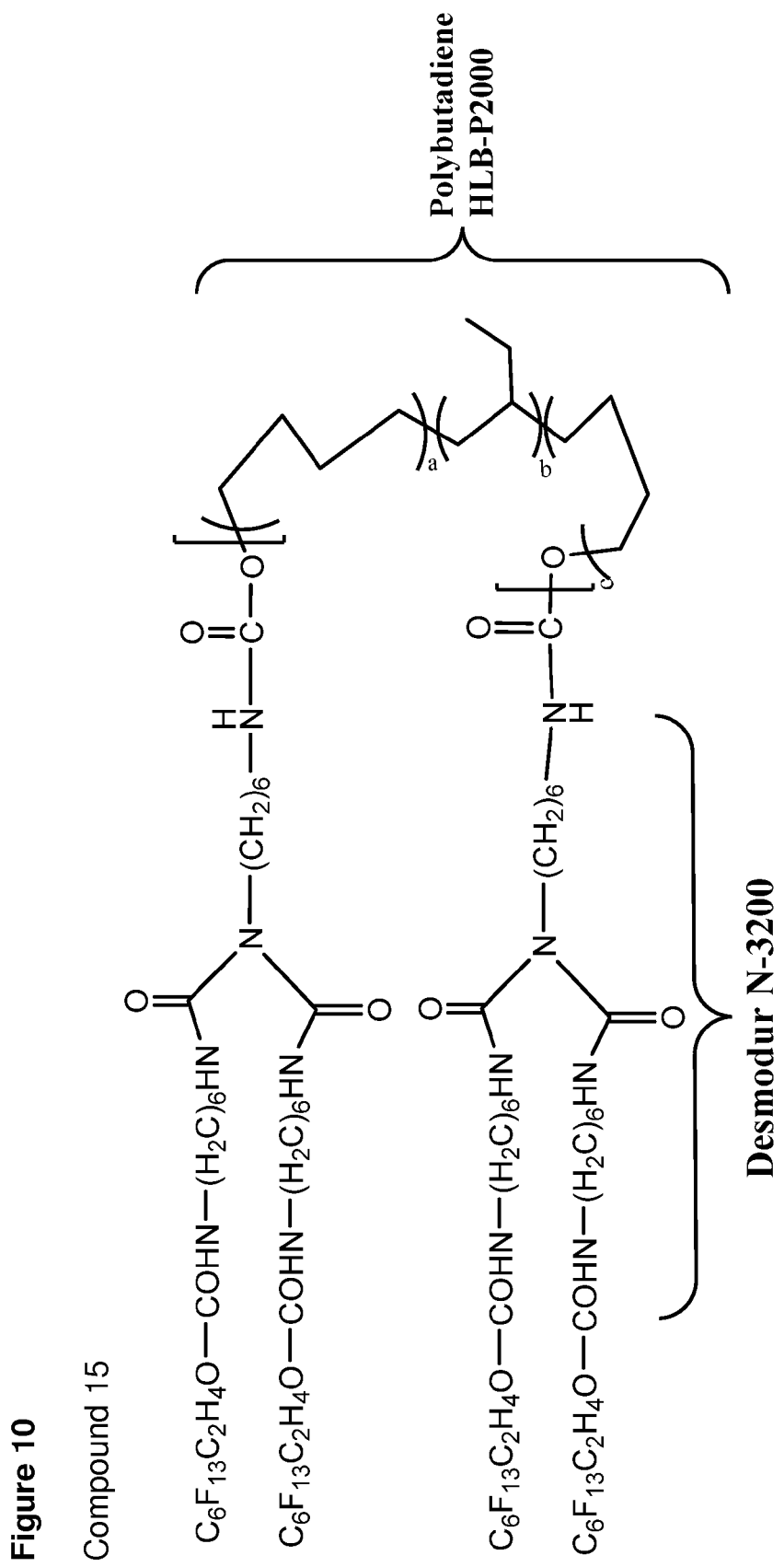
FIG. 10 shows a theoretical structure of Compound 15.
Figure 11:
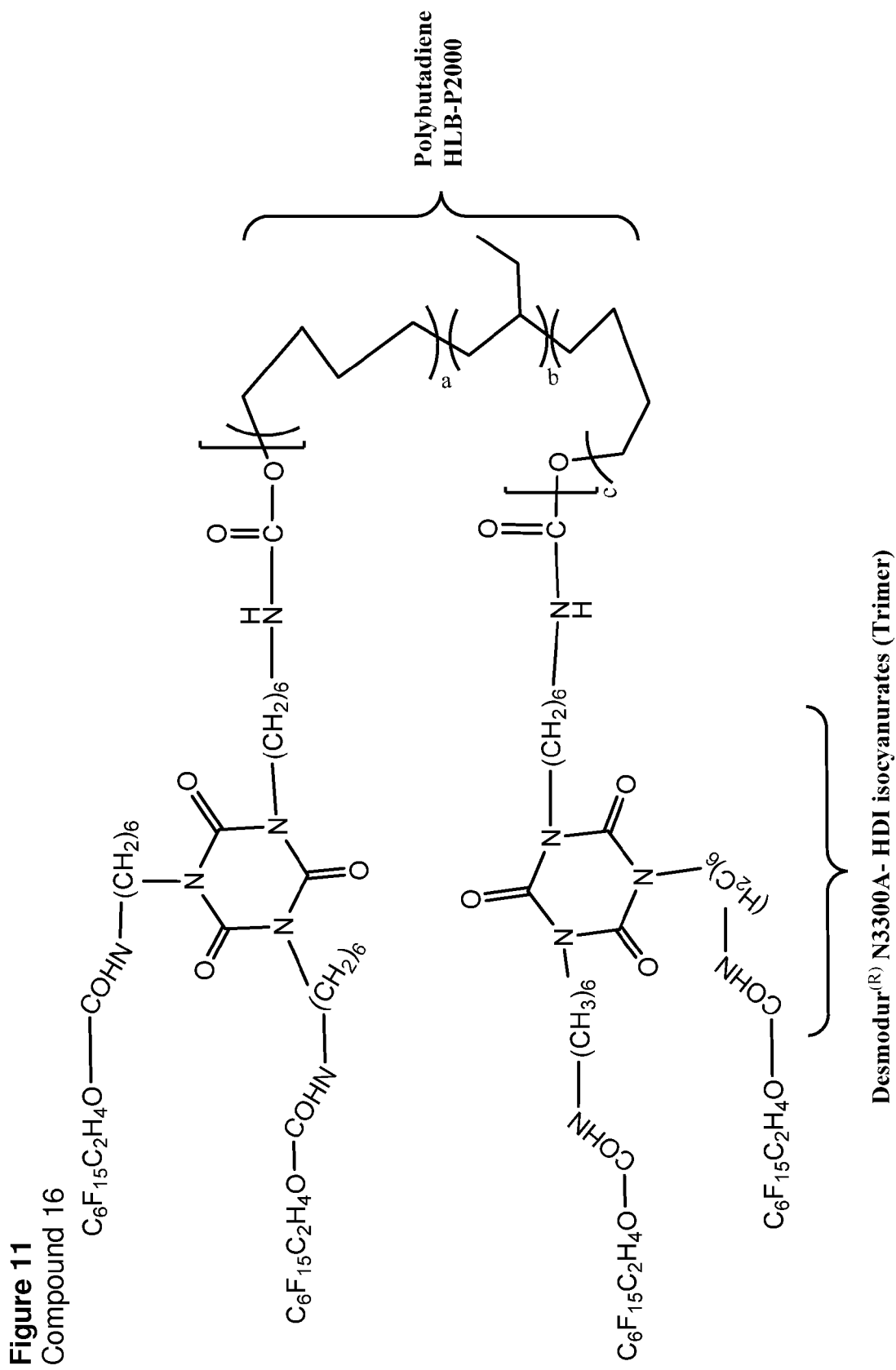
FIG. 11 shows a theoretical structure of Compound 16.
Figure 12:
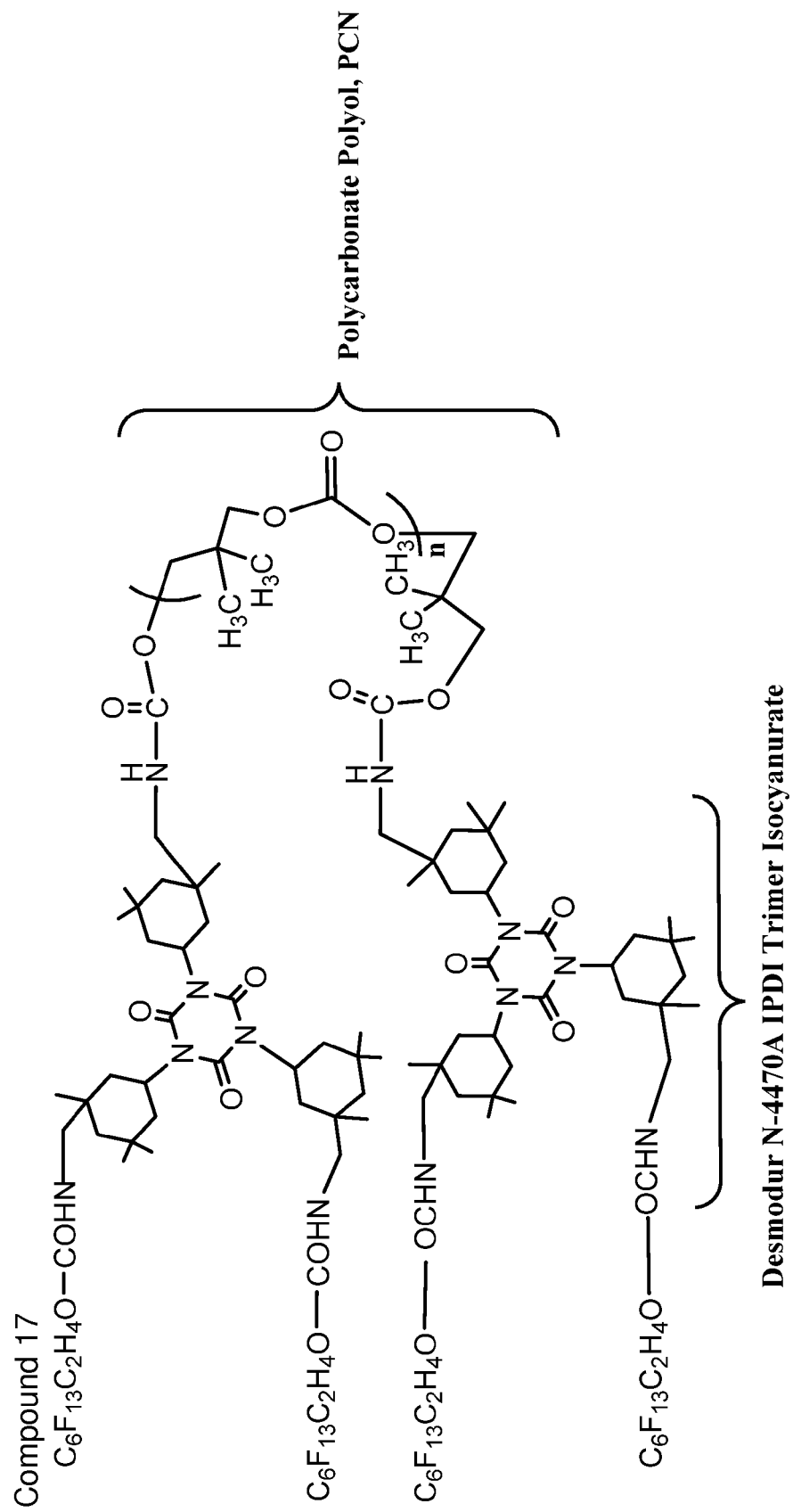
FIG. 12 shows a theoretical structure of Compound 17.
Figure 13:
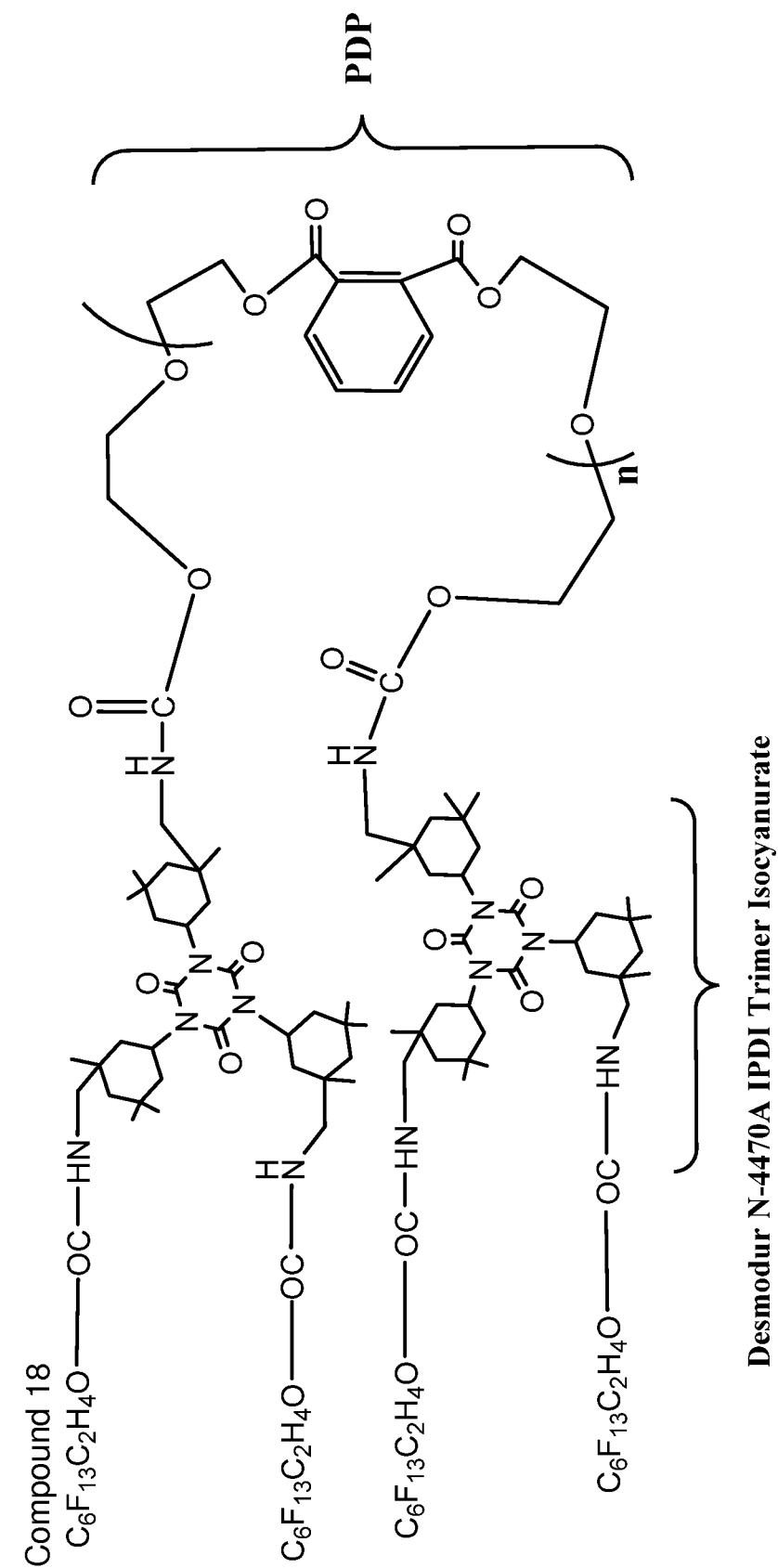
FIG. 13 shows a theoretical structure of Compound 18.
Figure 14:
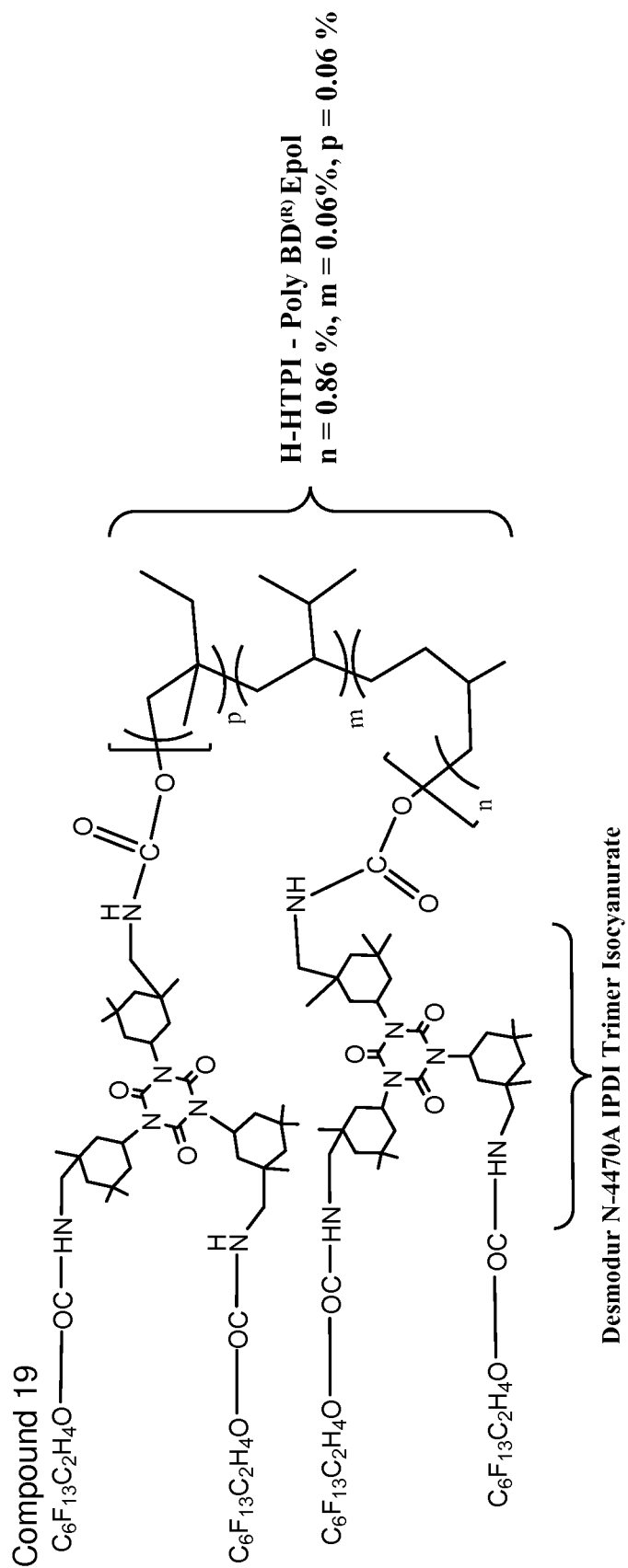
FIG. 14 shows a theoretical structure of Compound 19.
Figure 15:
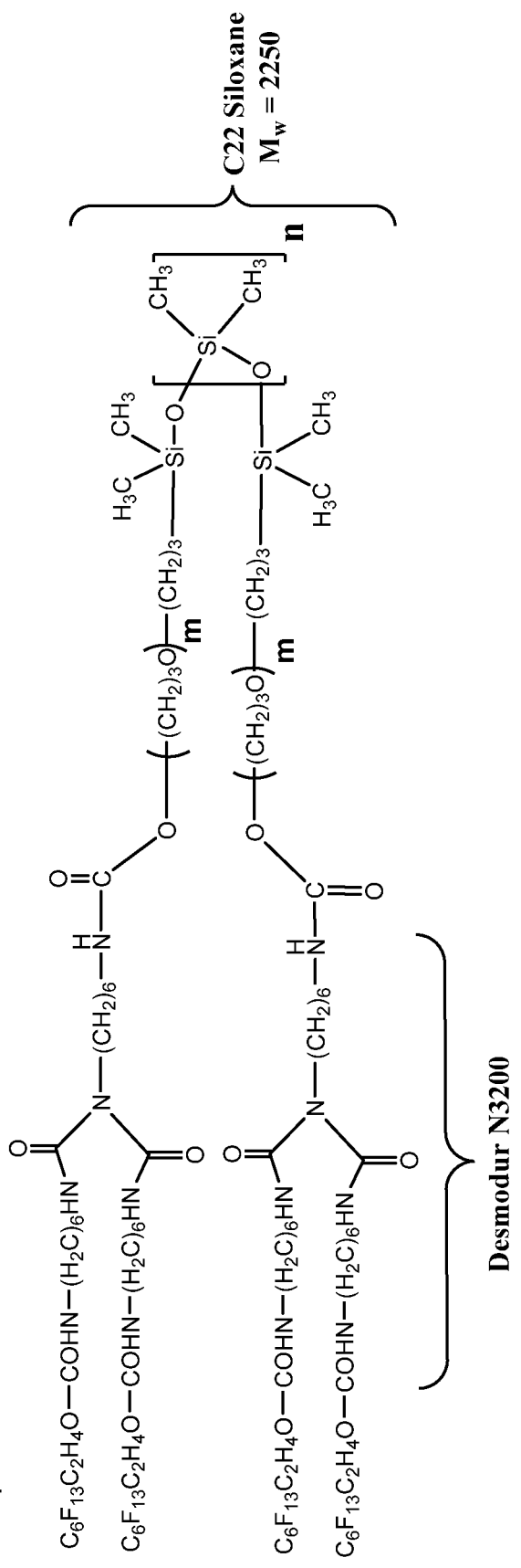
FIG. 15 shows a theoretical structure of Compound 20.
Figure 16:
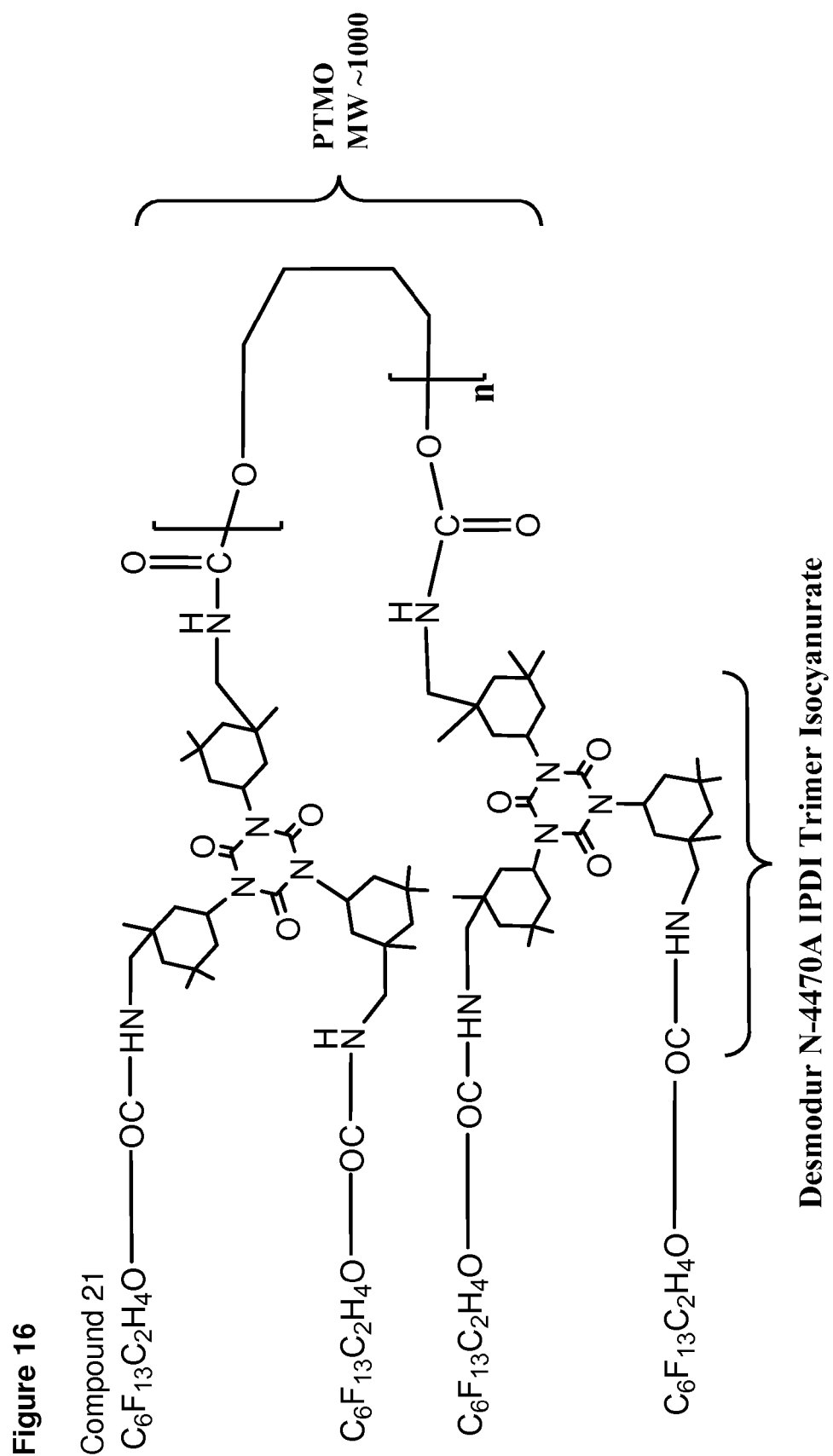
FIG. 16 shows a theoretical structure of Compound 21.
Figure 17:
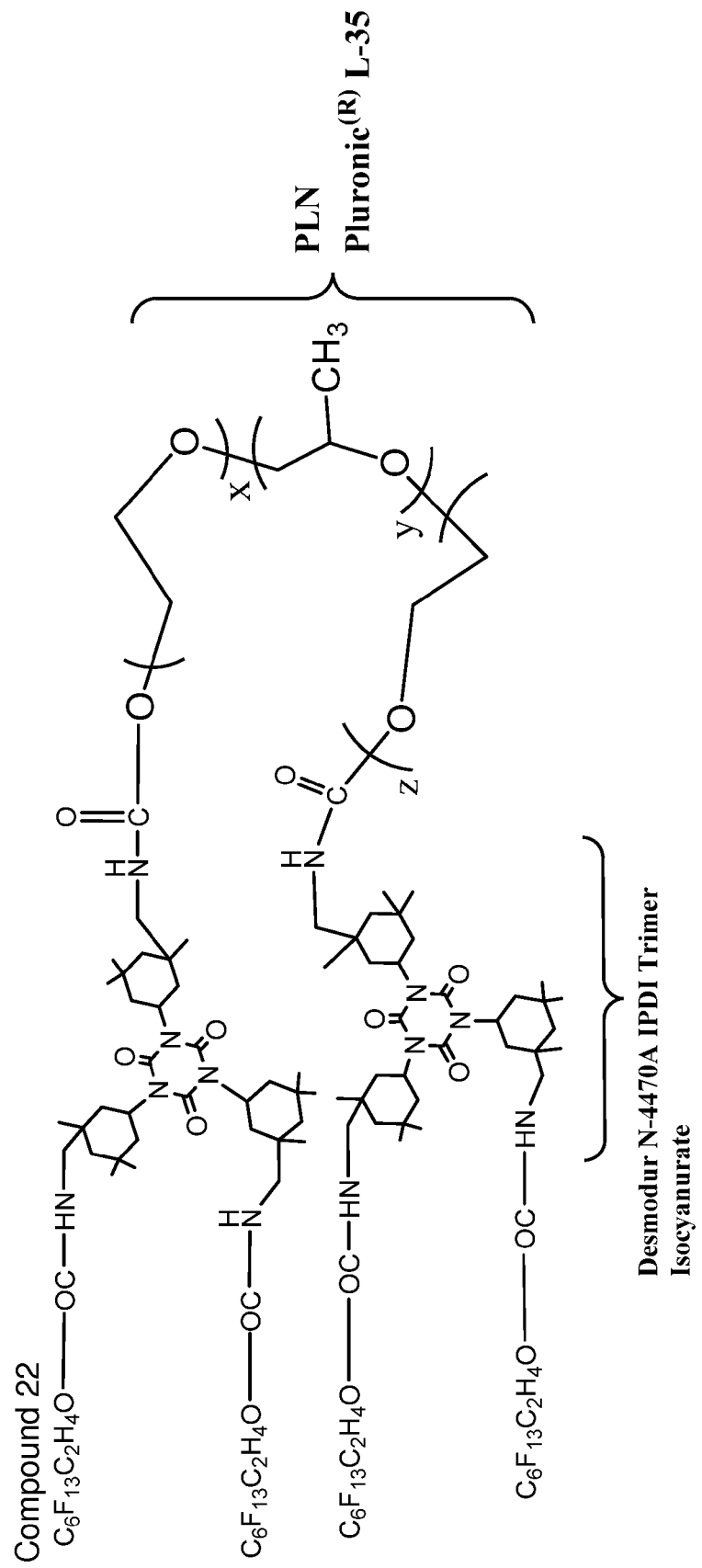
FIG. 17 shows a theoretical structure of Compound 22.
Figure 18:
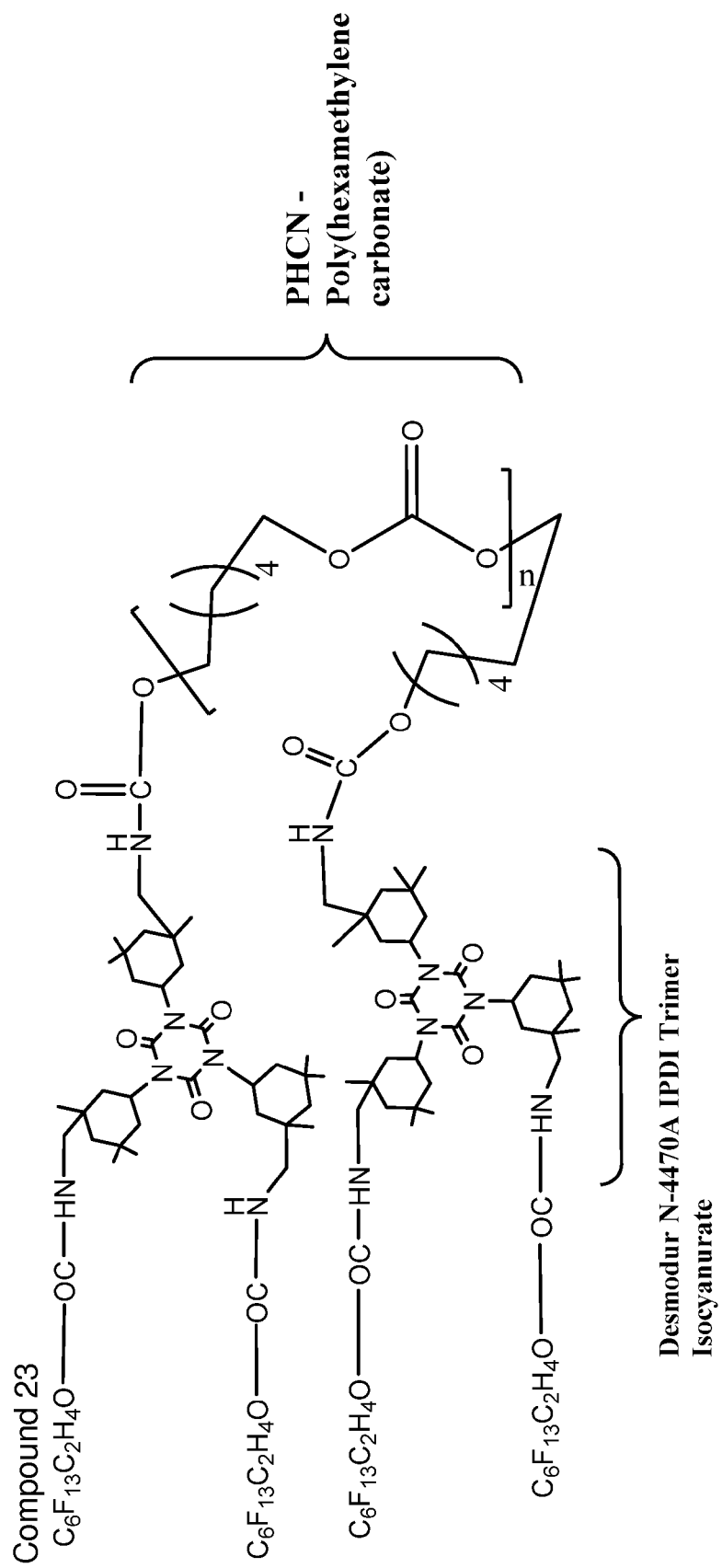
FIG. 18 shows a theoretical structure of Compound 23.
Figure 19:
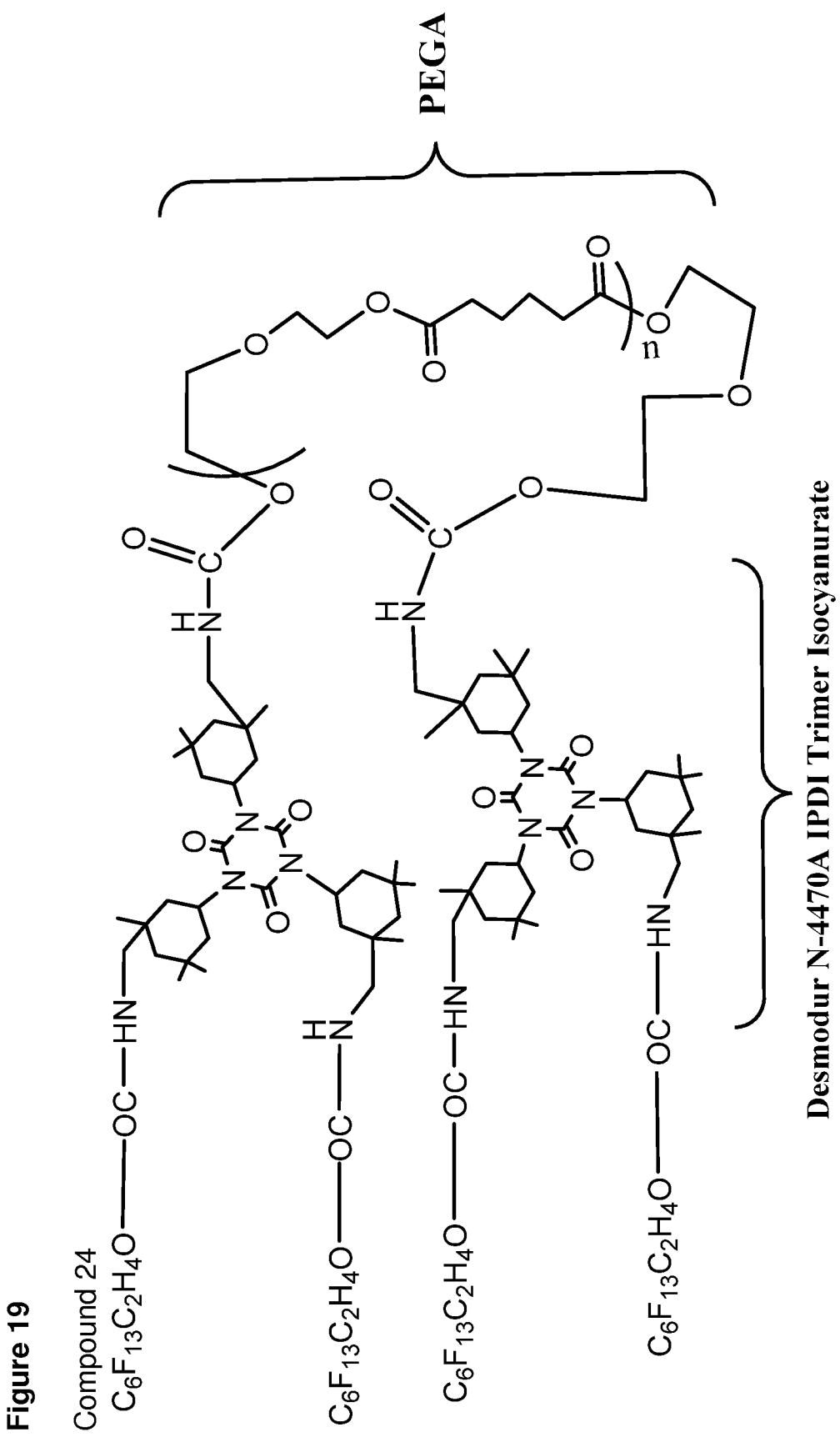
FIG. 19 shows a theoretical structure of Compound 24.
Figure 20:
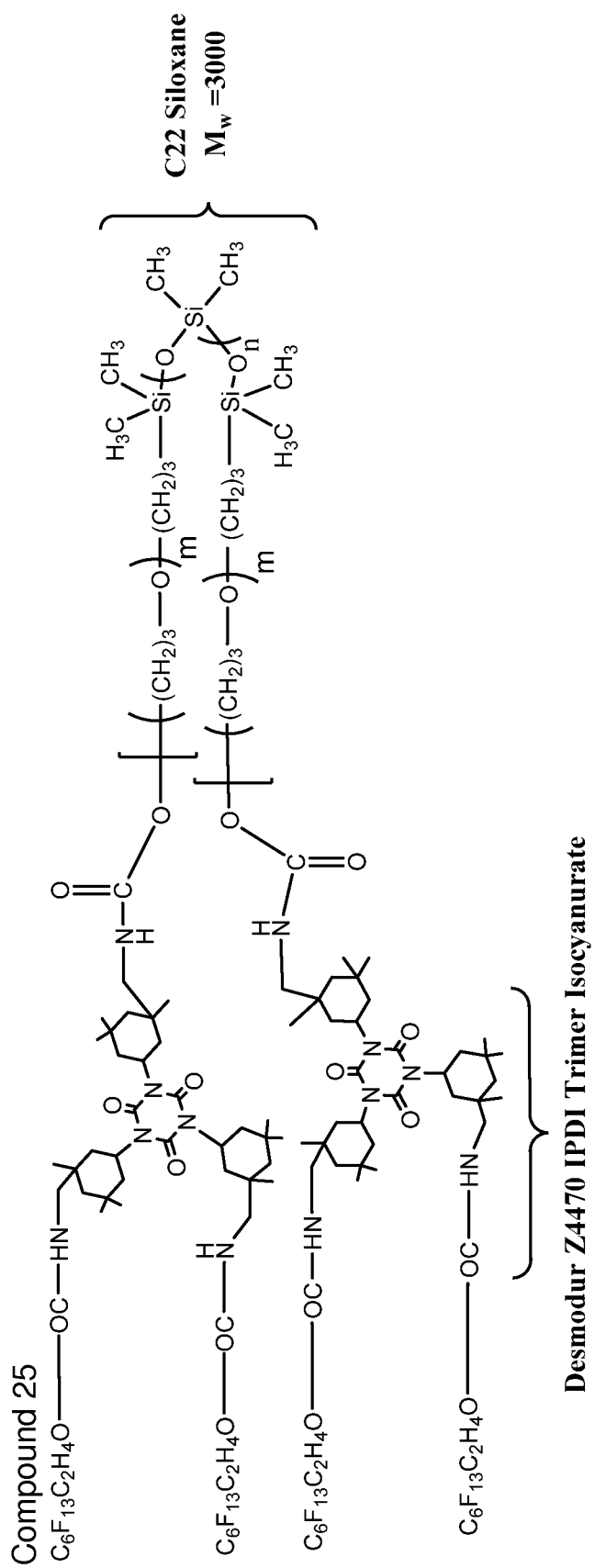
FIG. 20 shows a theoretical structure of Compound 25.
Figure 21:
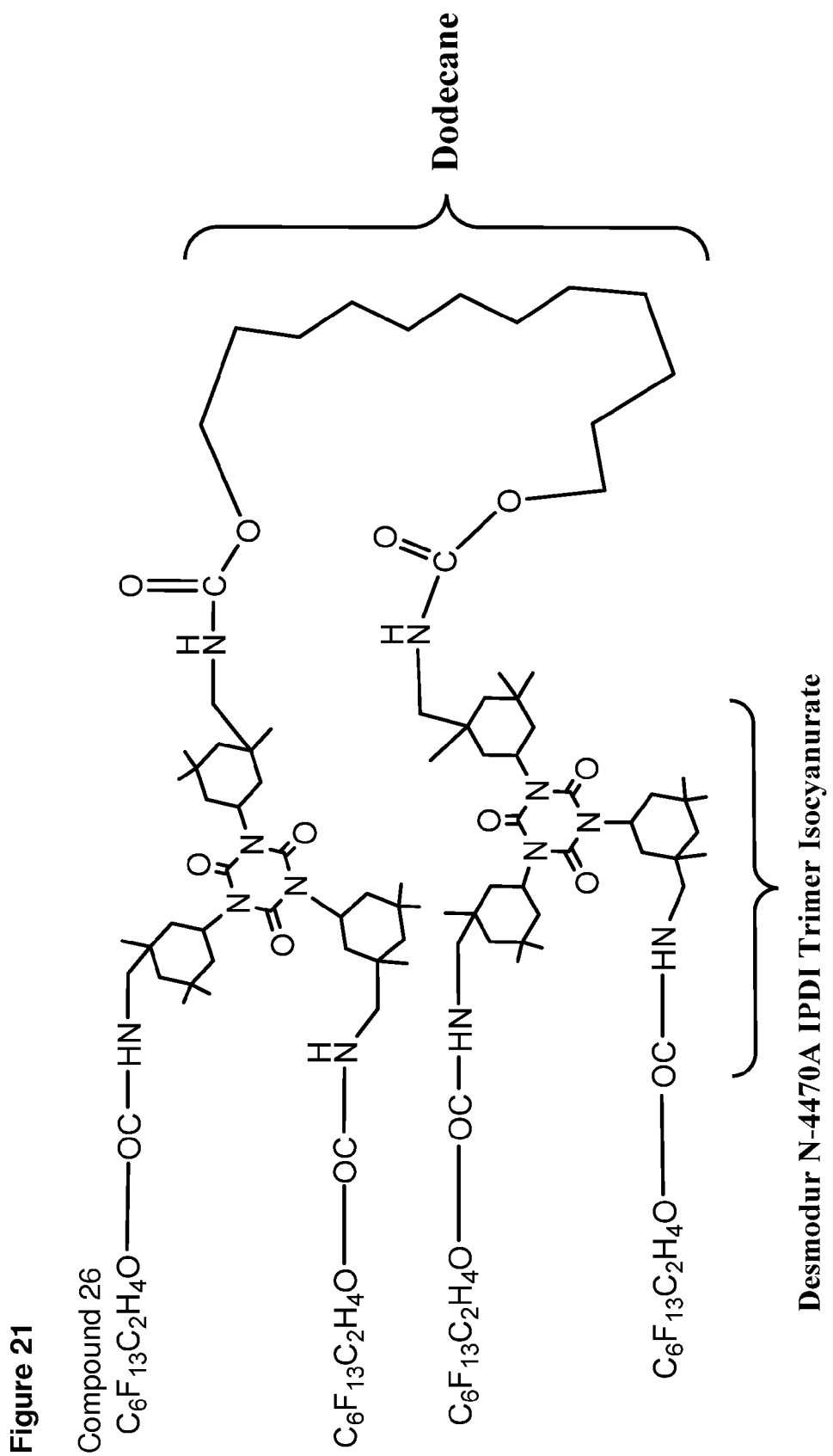
FIG. 21 shows a theoretical structure of Compound 26.
Figure 22A:
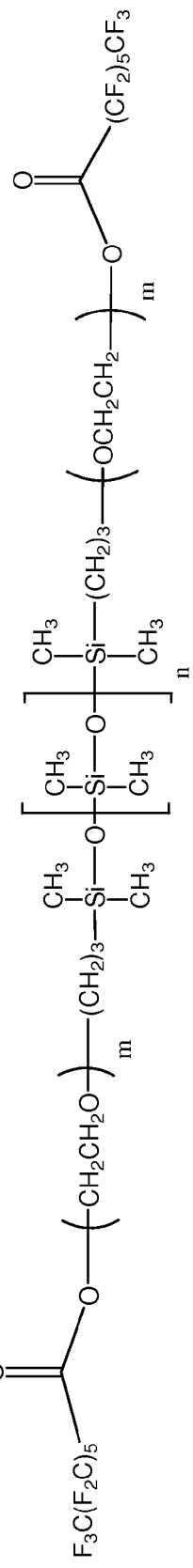
FIG. 22A shows a theoretical structure of Compound 27.
Figure 22B:
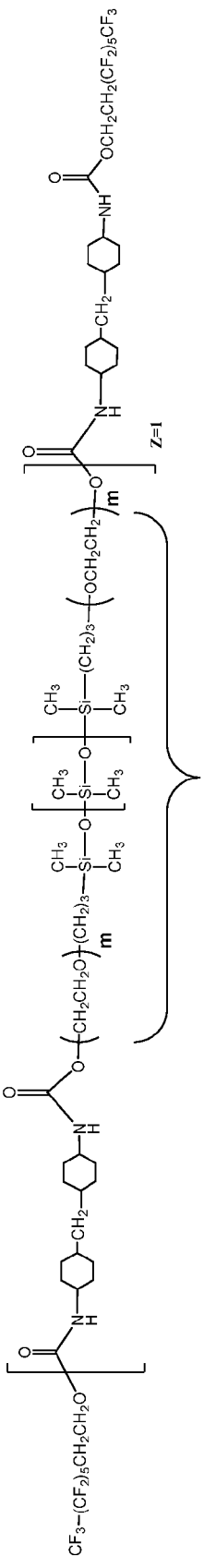
FIG. 22B shows a theoretical structure of Compound 28.

In another 50 ml round bottom flask 74.95 g (180 mmol) of C8-FOH (1H,1H,2H,2H-perfluoro-1-octanol) was added, capped with a septa, degassed and then purged with $N_2$. This was added to the 1000 ml flask containing prepolymer solution via a double-edged needle. All additions and transfers were conducted carefully in an atmosphere of dry $N_2$ to avoid any contact with air. The resulting mixture was heated to 45° C. for 18 hours to produce Compound 4 with the end-capped C8-FOH. The Compound 4 solution was allowed to cool to ambient temperature and at this point is milky in color. The milky solution was precipitated in MeOH (methanol). The polymer was washed repeatedly with 2 more MeOH washes to form a white viscous material with dough-like consistency. This viscous, semi-solid material was washed twice in THF/EDTA (ethylene diamine tetraacetic acid) to remove residual catalyst followed by two more successive washes in THF/MeOH to remove unreacted monomers, low molecular weight byproducts, and catalyst residues. The Compound 4 was first dried in a flow oven from at 40-120° C. in a period of 10 h gradually raising the temperature and finally dried under vacuum at 120° C. (24 h) and stored in a desiccator as a colorless rubbery semi-solid. The structure of Compound 4 is shown in FIG. 3B (Z=1).

Compound 1:

the reaction was carried out as described for Compound 4 using 180 g (74 mmol) Hydrogenated-hydroxyl terminated polybutadiene (HLBH diol, MW=2000) and 30.14 g (115 mmol) of 4,4'-methylene bis(cyclohexyl isocyanate) (HMDI) to form the prepolymer. The prepolymer was end-capped with 40.48 g (111.18 mmol) of 1H,1H,2H,2H-perfluoro-1-octanol (C8-FOH) to form Compound 1 as a colorless rubbery semi-solid. As described above, the couplings were carried out in the presence of bismuth carboxylate catalyst and the Compound 1 was washed similarly to Compound 4 and dried prior to use. The structure of Compound 1 is shown in FIG. 1 (Z=2).

The properties of Compound 4 and Compound 1 are shown in Table 2.

TABLE 2

| Properties | Test Method | | Compound 4 | Compound 1 |
|---|---|---|---|---|
| Appearance | Visual | | Rubbery semi-solid | Rubbery semi-solid |
| Theo. MW | Calc. from Structure | | 3785 Da | 6372 Da |
| Elemental Composition | Elemental Analysis (%) | C | 75.27 | 77.93 |
| | for Bi (ppm) | H | 11.98 | 12.41 |
| | | N | 1.45 | 1.44 |
| | | F | 8.26 | 6.51 |
| | | Bi | 12 ppm | 56 ppm |
| $T_d$, Thermal Degradation temp ($N_2$) | TGA, High Res TA Q500 | | First Onset at 5% wt loss, 326° C. | First Onset at 5% wt loss, 319° C. |
| Glass Transition Temperature, $T_g$ ($N_2$, Second heating) | DSC, TA Q100 | | −44.27° C. | −45.54° C. |

Figure 2:
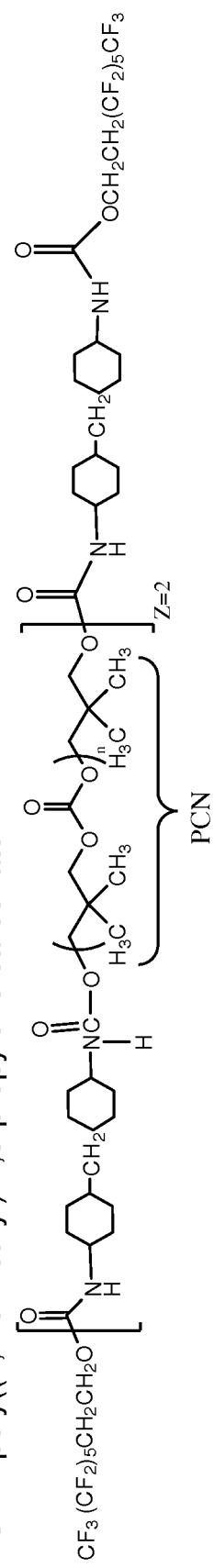
FIG. 2 shows a theoretical structure of Compound 2.

Compound 2:

the reaction was carried out as described for Compound 4, except the solvent was changed from toluene to DMAC. Here, 100 g (100 mmol) poly((2,2-dimethyl)-1,3-propylene carbonate)diol (PCN, MW 1000) and 40.7 g (155 mmol) of 4,4'-methylene bis(cyclohexyl isocyanate) (HMDI) to form the prepolymer. The prepolymer was end-capped with 45.5 g (125 mmol) of 1H,1H,2H,2H-perfluoro-1-octanol (C8-FOH) to form Compound 2. The work-up after the reaction and the subsequent washing procedures are modified from Compound 4 as follows. The SMM from the reaction mixture in DMAC was precipitated in distilled water, and washed successively in IPA/EDTA (Isopropanol/ethylene diamine tetraacetic acid) solution followed by another wash in IPA/hexanes to remove unreacted monomers, low molecular weight byproducts and catalyst residues to yield Compound 2 as a white amorphous powder. As described above, the couplings were carried out in the presence of bismuth carboxylate catalyst and dried under vacuum prior to use. The structure of Compound 2 is shown in FIG. 2. Alternatively, a surface-modifying macromolecule, as shown in FIG. 2 with the exception that Z=1, can be prepared according to the procedure described herein for Compound 2 with adjusted stoichiometry.

Example 2—Preparation of Films

The films of the invention can be prepared from a base polymer and a surface modifying macromolecule according to methods known in the art and described herein. Samples of certain films of the invention were prepared from Dowlex 2244G LLDPE with Compound 1 or Compound 4, such that the content of the surface modifying macromolecule in the film was 4%. Another film was prepared from Dowlex 2244G LLDPE without including a surface modifying macromolecule.

Example 3—Water Vapor Transmission Rate of Films of the Invention

The water vapor transmission rate (WVTR) test was performed on the samples prepared in Example 2 on MOCON Permatran-W 3/33 instrument at 38° C. (100° F.). The protocol for WVTR test was in accordance with ASTM F-1249. The test gas was water vapor (90% RH), and the carrier gas was dry nitrogen (0% RH). The samples were masked to 5 cm$^2$. The replicate experiments were performed on duplicate samples of the same film. The test results are shown in Table 3.

TABLE 3

| Sample | Thickness Average, mil | WVTR, g/(m$^2$ · day · mil) | | |
|---|---|---|---|---|
| | | Experiment 1 | Experiment 2 | Average |
| LLDPE | 1.3 | 7.55 | 7.51 | 7.53 |
| LLDPE + Compound 4 | 2.6 | 3.49 | 3.57 | 3.53 |
| LLDPE + Compound 1 | 2.8 | 2.99 | 2.99 | 2.99 |

Water vapor transmission rate (WVTR) test can be performed in accordance with ASTM F-1249 on films prepared (e.g., by extrusion) from an admixture of a base polymer (e.g., a polyalkylene) and a surface-modifying macromolecule (e.g., any one of Compounds 1-28).

Other Embodiments

Various modifications and variations of the described materials and methods of use of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention.

Other embodiments are in the claims.

The invention claimed is:

1. A packaging material comprising a film, said film comprising a barrier layer formed from an admixture comprising a base polymer and a surface-modifying macromolecule, wherein the surface-modifying macromolecule is a polyurethane comprises fluorinated terminal groups.

2. The packaging material of claim 1, wherein WVTR of said barrier layer is less than 4.0 g/(m$^2$·day·mil) at 38° C. and 90% RH.

3. The packaging material of claim 1, wherein WVTR of said barrier layer at least 20% lower than WVTR of said layer without said surface-modifying macromolecule.

4. The packaging material of claim 1, wherein said base polymer is a polyalkylene, a polyester, a polyamide, a polyurethane, or a polysaccharide, or a blend of thereof.

5. The packaging material of claim 4, wherein said base polymer is a polyalkylene or a polyester or a blend thereof.

6. The packaging material of claim 5, wherein said polyalkylene is a polyethylene, a polypropylene, polyvinyl chloride, polystyrene, ethylene vinyl alcohol, a cyclic olefin copolymer, or a cyclic olefin copolymer.

7. The packaging material of claim 6, wherein said polyalkylene is a polyethylene, a polypropylene, polyvinyl chloride, polystyrene, or ethylene vinyl alcohol.

8. The packaging material of claim 5, wherein said polyester is polyethylene terephthalate, polyethylene naphthalate, or polylactide.

9. The packaging material of claim 1, wherein said admixture comprises from 0.05% (w/w) to 10% (w/w) of said surface modifying macromolecule.

10. The packaging material of claim 1, wherein said film is formed by extrusion, calender rolling, casting, lamination, or solution deposition.

11. The packaging material of claim 1, wherein said film is formed by extrusion, calender rolling, or lamination.

12. The packaging material of claim 1, wherein said packaging material is a forming web or a non-forming web.

13. The packaging material of claim 1, wherein said packaging material comprises one and only one said barrier layer.

14. The packaging material of claim 1, wherein said barrier layer has a thickness equal to or less than 500 μm.

15. The packaging material of claim 14, wherein said barrier layer has a thickness equal to or less than 300 μm.

16. The packaging material of claim 15, wherein said barrier layer has a thickness equal to or less than 200 μm.

17. The packaging material of claim 1, wherein said barrier layer has a thickness equal to or greater than 10 μm.

18. The packaging material of claim 17, wherein said barrier layer has a thickness equal to or greater than 25 μm.

19. The packaging material of claim 1, wherein said barrier film is a multilayer film.

20. The packaging material of claim 19, wherein said packaging material comprises two or more said barrier layers, each said barrier layer formed from an admixture comprising a base polymer and a surface-modifying macromolecule.

21. The packaging material of claim 1, wherein said barrier film is a bilayer film.

22. The packaging material of claim 1, wherein said barrier film is a trilayer film.

23. The packaging material of claim 1, wherein said barrier film is a tetralayer film.

24. The packaging material of claim 1, wherein said barrier film is a single layer film.

25. The packaging material of claim 1, wherein said packaging material is a sterilizable packaging material.

26. A container comprising the packaging material of claim 1.

27. The container of claim 23, wherein said package is a primary package or a secondary package.

28. The container of claim 23, wherein said container is a pouch, a box, or an envelope.

29. The container of claim 23 further comprising a good.

30. The container of claim 29, wherein said good is a dry good.

31. The container of claim 29, wherein said good is a liquid good.

32. The container of claim 29, wherein said good is a food product or a pharmaceutical product.

33. A method of storing a good, comprising preparing the packaging material of claim 1 and arranging said good and a container comprising said packaging material so as to isolate said good from the environment external to said container.

34. The method of claim 33 further comprising forming said packaging material into said container prior to said arranging.

35. The method of claim 33 further comprising sealing said container after said arranging.

36. The method of claim 33 further comprising sterilizing said packaging material prior to said arranging.

37. The method of claim 33 further comprising sterilizing said packaging material after said arranging.

* * * * *